United States Patent
Ivans et al.

(10) Patent No.: US 12,473,086 B2
(45) Date of Patent: Nov. 18, 2025

(54) PROTECTIVE SHROUD FOR AIRCRAFT TAIL ROTOR

(71) Applicant: TEXTRON INNOVATIONS INC., Providence, RI (US)

(72) Inventors: Steven R. Ivans, Ponder, TX (US); Danielle Lynn Moore, Arlington, TX (US); William Anthony Amante, Grapevine, TX (US); Kip Gregory Campbell, Hurst, TX (US); Mathew Chapdelaine, Fort Worth, TX (US); Brian John Cox, Keller, TX (US); Carey Andrew Cross, Fort Worth, TX (US); Steve Michael Loveland, Fort Worth, TX (US); Bradley Paul Regnier, Fort Worth, TX (US); Robert W. Roe, Fort Worth, TX (US); Steve R. Schafer, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 212 days.

(21) Appl. No.: 17/873,983

(22) Filed: Jul. 26, 2022

(65) Prior Publication Data
US 2024/0034465 A1 Feb. 1, 2024

(51) Int. Cl.
*B64C 27/82* (2006.01)
*B64C 27/20* (2023.01)

(52) U.S. Cl.
CPC ............. *B64C 27/82* (2013.01); *B64C 27/20* (2013.01); *B64C 2027/8272* (2013.01); *B64C 2027/829* (2013.01)

(58) Field of Classification Search
CPC . B64C 27/82; B64C 27/20; B64C 2027/8272; B64C 2027/829; B64C 2027/8254; A63H 27/00
See application file for complete search history.

(56) References Cited

U.S. PATENT DOCUMENTS

D197,821 S  *  3/1964  Chaney et al. .............. D12/327
3,241,791 A  *  3/1966  Piasecki .................. B64C 27/82
                                                    244/6

(Continued)

FOREIGN PATENT DOCUMENTS

EP    3878738 A1    9/2021
JP    H10100998 A   4/1998
WO    2020250010 A1 12/2020

OTHER PUBLICATIONS

English Translation of EP-3878738A1.
English Translation of JP-H10100998A.

*Primary Examiner* — Joshua J Michener
*Assistant Examiner* — Cindi M Curry
(74) *Attorney, Agent, or Firm* — Akona IP PC

(57) ABSTRACT

One embodiment is an apparatus for inhibiting accidental contact by a human with a tail rotor connected to an empennage of an aircraft. The apparatus includes an inverted V-tail connected to an empennage of the aircraft forward of the tail rotor, the inverted V-tail stabilizer comprising a first V-tail stabilizer on a side of the empennage to which the tail rotor is connected and a second V-tail stabilizer on a side of the empennage opposite the side of the empennage to which the tail rotor is connected; and a shroud bar having a first end connected to an outboard end of the first V-tail stabilizer and a second end opposite the first end connected to the empennage aft of the tail rotor, wherein a horizontal distance from the shroud bar to the tail rotor is greater than a length of an arm of the human.

20 Claims, 35 Drawing Sheets

(56) References Cited

U.S. PATENT DOCUMENTS

| | | | |
|---|---|---|---|
| 3,332,643 A | 7/1967 | Toner | |
| 3,583,659 A * | 6/1971 | Lermusiaux | B64C 27/82 |
| | | | 416/247 R |
| 4,768,737 A | 9/1988 | Broadley | |
| 4,809,931 A | 3/1989 | Mouille et al. | |
| 4,982,914 A | 1/1991 | Eickmann | |
| 5,251,847 A | 10/1993 | Guimbal | |
| 5,381,312 A | 1/1995 | Authier | |
| 5,738,301 A | 4/1998 | Francois et al. | |
| 7,438,259 B1 | 10/2008 | Piasecki et al. | |
| 7,959,105 B2 | 6/2011 | Marze | |
| 8,109,802 B2 | 2/2012 | Chui et al. | |
| D712,310 S * | 9/2014 | Gundlach | D12/319 |
| D713,321 S | 9/2014 | Cummings | |
| 8,985,500 B2 | 3/2015 | Borie et al. | |
| D894,814 S | 9/2020 | Kooiman et al. | |
| D896,730 S | 9/2020 | Kooiman et al. | |
| D899,344 S * | 10/2020 | Voloscsuk | D12/326 |
| 10,953,982 B2 | 3/2021 | Moffitt et al. | |
| 11,052,999 B2 | 7/2021 | Ross et al. | |
| 11,267,579 B2 | 3/2022 | Ross et al. | |
| 11,655,021 B2 | 5/2023 | Pfaller et al. | |
| 11,697,493 B2 | 7/2023 | Pfaller et al. | |
| 11,993,391 B1 | 5/2024 | Piasecki | |
| 12,037,110 B2 | 7/2024 | Pfaller et al. | |
| 12,084,183 B2 | 9/2024 | Pfaller et al. | |
| 2008/0272244 A1 * | 11/2008 | Bjornenak | B64C 27/30 |
| | | | 244/7 R |
| 2009/0277991 A1 | 11/2009 | Mikulla | |
| 2011/0065351 A1 | 3/2011 | Corsiglia et al. | |
| 2011/0178711 A1 | 7/2011 | Christoph | |
| 2014/0062755 A1 | 3/2014 | Kabrt et al. | |
| 2015/0307190 A1 | 10/2015 | Probst et al. | |
| 2015/0360794 A1 | 12/2015 | Certain et al. | |
| 2016/0251080 A1 | 9/2016 | Wehle et al. | |
| 2016/0264240 A1 | 9/2016 | Stucki | |
| 2018/0000062 A1 | 1/2018 | Khawam | |
| 2018/0002034 A1 | 1/2018 | Khawam | |
| 2018/0362190 A1 * | 12/2018 | Chambers | B64F 5/60 |
| 2019/0241278 A1 | 8/2019 | Khawam | |
| 2019/0308722 A1 | 10/2019 | Hampton et al. | |
| 2020/0023958 A1 | 1/2020 | Acee et al. | |
| 2020/0198781 A1 | 6/2020 | Haldeman et al. | |
| 2020/0277049 A1 | 9/2020 | Kooiman et al. | |
| 2020/0297119 A1 | 9/2020 | Nelson | |
| 2020/0331600 A1 | 10/2020 | McNulty et al. | |
| 2020/0339252 A1 | 10/2020 | Choi et al. | |
| 2020/0407060 A1 | 12/2020 | Hosseini | |
| 2021/0030784 A1 | 2/2021 | George | |
| 2021/0053672 A1 | 2/2021 | Villabrille Prades | |
| 2021/0207780 A1 | 7/2021 | Rutherford | |
| 2021/0262630 A1 | 8/2021 | Jha et al. | |
| 2021/0284333 A1 | 9/2021 | Windisch | |
| 2021/0339875 A1 | 11/2021 | Harms | |
| 2022/0169376 A1 | 6/2022 | Dugré et al. | |
| 2022/0169377 A1 | 6/2022 | Bustamante et al. | |
| 2023/0360536 A1 | 11/2023 | Breuer et al. | |
| 2024/0034464 A1 | 2/2024 | Chapdelaine | |
| 2024/0239512 A1 | 7/2024 | Heckl et al. | |

* cited by examiner

PROTECTIVE SHROUD FOR AIRCRAFT TAIL ROTOR

TECHNICAL FIELD

This disclosure relates in general to the field of aircraft and, more particularly, though not exclusively, to a protective shroud for a tail rotor of an aircraft.

BACKGROUND

Certain rotorcraft, such as helicopters, may be provided with a tail rotor system for providing anti-torque and/or directional control for the rotorcraft. Such tail rotor systems may often include an open tail rotor, which may be considered a safety hazard to aircraft ground personnel and passengers in the vicinity of the tail rotor. A number of alternatives to an open rotor system have been proposed to provide anti-torque features for rotorcraft; however, such alternatives are typically significantly heavier and perform less effectively than a conventional open rotor anti-torque system.

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements.

DETAILED DESCRIPTION

Figure 1A:
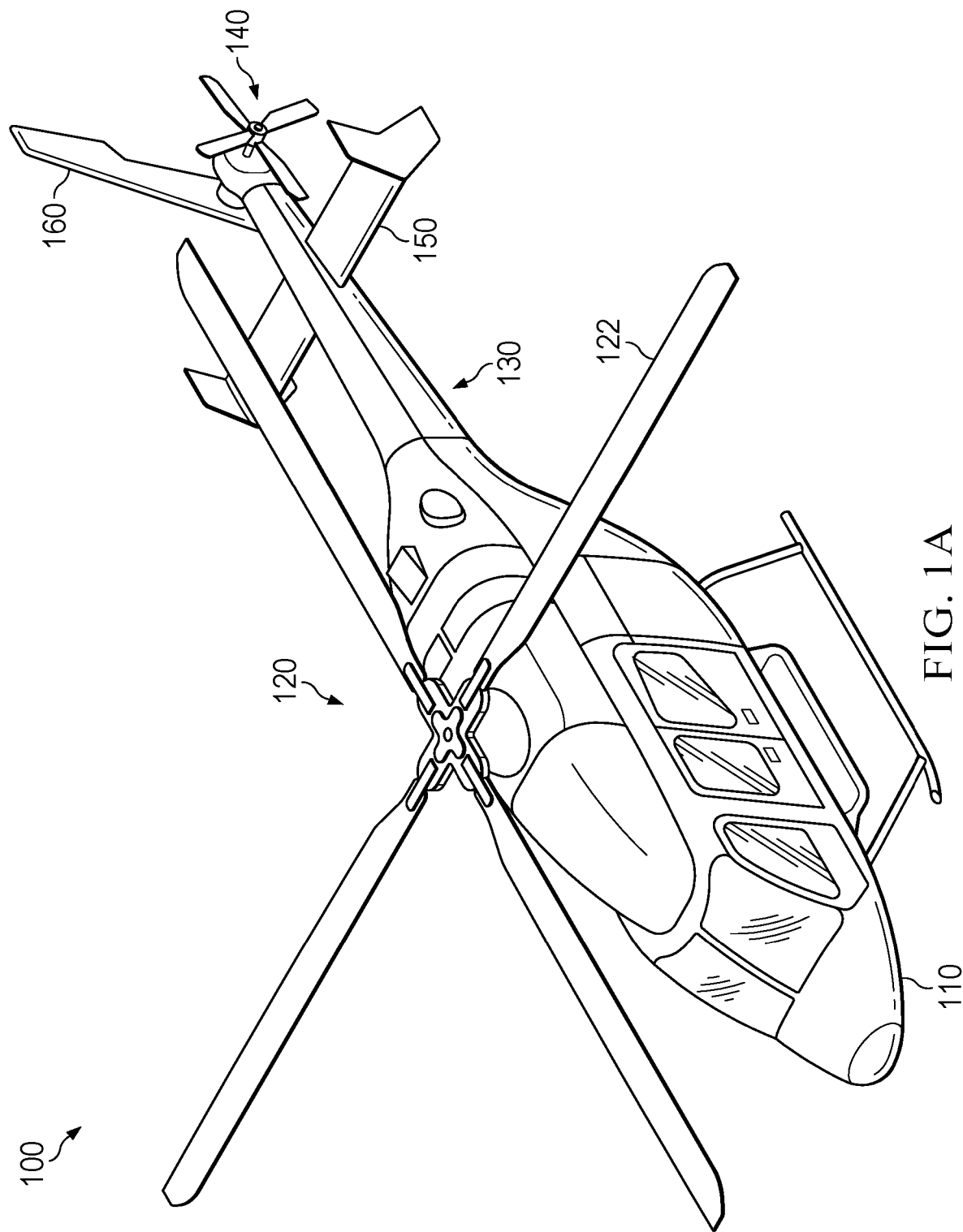
FIGS. 1A-1C illustrate a rotorcraft in which embodiments described herein may be implemented.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Additionally, as referred to herein in this specification, the terms "forward," "aft," "inboard," and "outboard" may be used to describe relative relationship(s) between components and/or spatial orientation of aspect(s) of a component or components. The term "forward" may refer to a spatial direction that is closer to a front of an aircraft relative to another component or component aspect(s). The term "aft" may refer to a spatial direction that is closer to a rear of an aircraft relative to another component or component aspect(s). The term "inboard" may refer to a location of a component that is within the fuselage of an aircraft and/or a spatial direction that is closer to or along a centerline of the aircraft (wherein the centerline runs between the front and the rear of the aircraft) or other point of reference relative to another component or component aspect. The term "outboard" may refer to a location of a component that is outside the fuselage of an aircraft and/or a spatial direction that farther from the centerline of the aircraft or other point of reference relative to another component or component aspect.

Further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying figures.

Figure 1B:
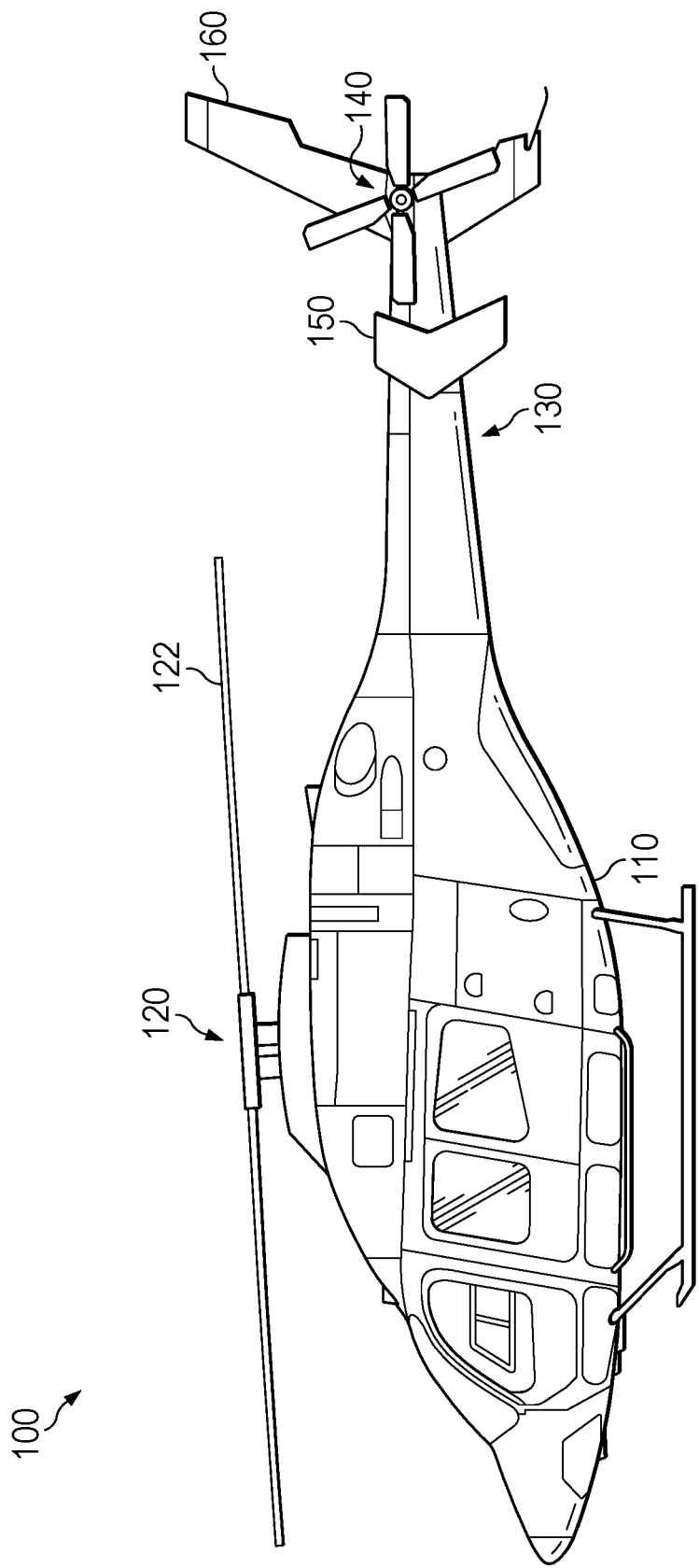
Figure 1C:
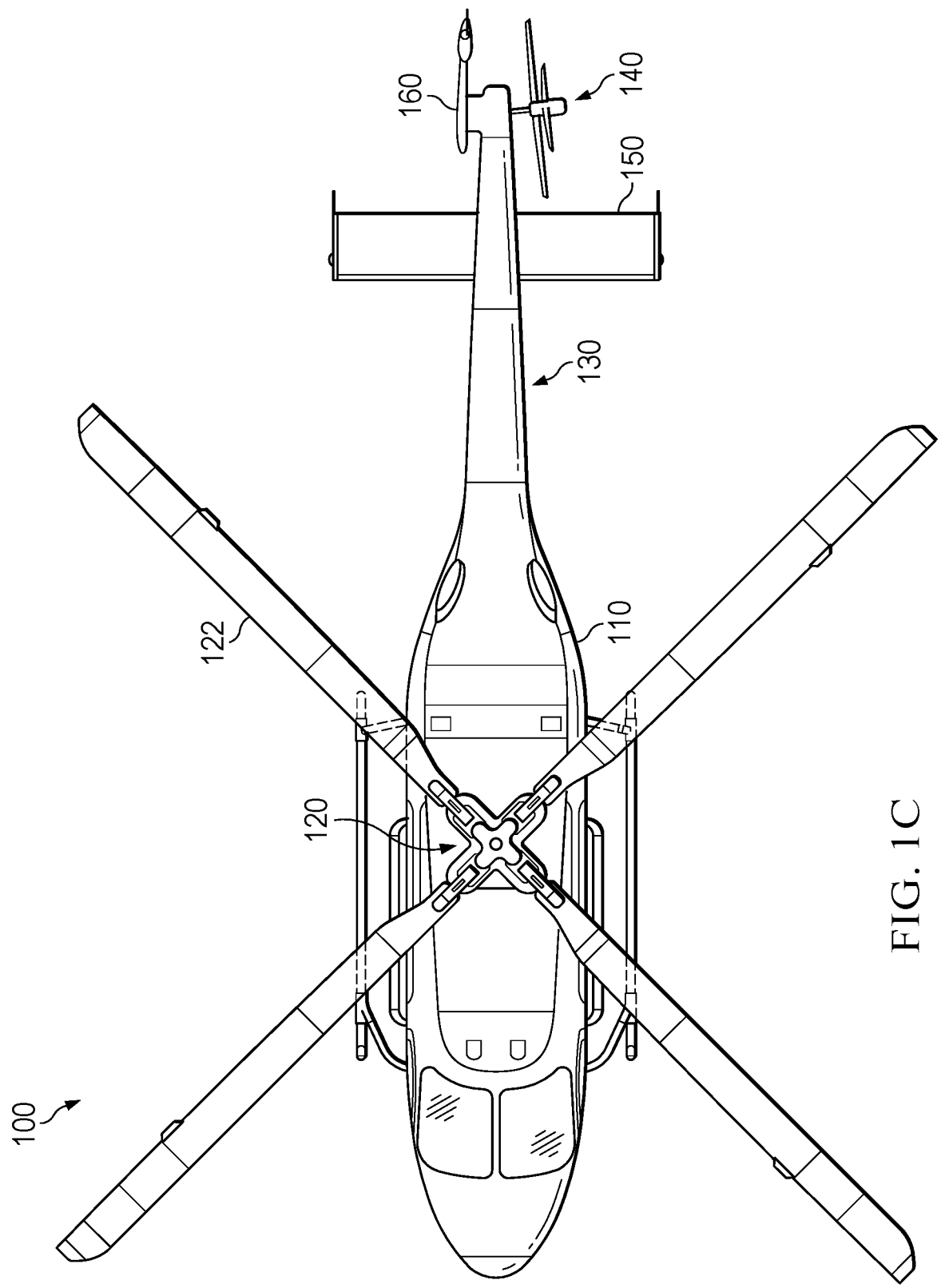

FIGS. 1A-1C illustrate various views of an example embodiment of a rotorcraft 100. Rotorcraft 100 includes a fuselage 110, a rotor system 120, and an empennage 130. The fuselage 110 is the main body of the rotorcraft, which may include a cabin for the crew, passengers, and/or cargo, and may also house certain mechanical and electrical components, such as the engine(s), transmission, and flight controls. The rotor system 120 is used to generate lift for the rotorcraft using a plurality of rotating rotor blades 122. For example, torque generated by the engine(s) causes the rotor blades 122 to rotate, which in turn generates lift. Moreover, the pitch of each rotor blade 122 can be adjusted in order to selectively control direction, thrust, and lift for the rotorcraft 100. The empennage 130 is the tail assembly of the rotorcraft. In the illustrated embodiment, the empennage 130 includes a tail rotor system 140, which may be used to provide anti-torque and/or directional control.

In the illustrated embodiment, the empennage 130 also includes a horizontal stabilizer 150 and a vertical stabilizer 160. In general, a stabilizer is an aerodynamic surface or airfoil that produces an aerodynamic lifting force (either positive or negative). For example, a stabilizer may be a fixed or adjustable structure with an airfoil shape, and may also include one or more movable control surfaces. The primary purpose of a stabilizer is to improve stability about a particular axis (e.g., pitch or yaw stability), although a stabilizer can also provide other secondary aerodynamic benefits.

A horizontal stabilizer (e.g., horizontal stabilizer 150) is primarily used to provide stability in pitch, or longitudinal stability. For example, both the rotor and fuselage of a rotorcraft typically have an inherent negative stability derivative in pitch, and accordingly, a horizontal stabilizer may be used to neutralize pitch instability and improve the overall handling qualities of the rotorcraft. A horizontal stabilizer may also be used to generate lift for a rotorcraft, for example, to aid in climb or ascent. In some cases, a horizontal stabilizer may also include one or more movable control surfaces, such as an adjustable slat to aid in generating lift. The design of a horizontal stabilizer (e.g., airfoil shape, size, position on a rotorcraft, control surfaces) implicates numerous performance considerations and is often an extremely challenging aspect of aircraft design.

A vertical stabilizer (e.g., vertical stabilizer 160) is primarily used to provide stability in yaw, or directional stability. Although considerable yaw stability and control is often provided by a tail rotor, a vertical stabilizer may be used to supplement the performance of the tail rotor and/or reduce the performance requirements of the tail rotor. Accordingly, designing a vertical stabilizer and a tail rotor often implicates numerous interrelated performance considerations, particularly due to the interaction between their respective airflows. For example, a smaller vertical stabilizer may reduce the adverse effects on tail rotor efficiency, but may adversely impact yaw stability and other design requirements (e.g., sideward flight performance, internal capacity for housing components within the vertical stabilizer). Accordingly, various performance considerations must be carefully balanced when designing a vertical stabilizer.

It will be recognized that various embodiments of horizontal and vertical stabilizers with designs that balance a variety of performance considerations to provide optimal performance may be provided. For example, certain embodiments of a horizontal stabilizer may be designed to provide strong aerodynamic performance (e.g., pitch stability and/or generating sufficient lift during climb or ascent) without using slats. Such a horizontal stabilizer may use a tailored airfoil design that is cambered and may form a concave slope on the top surface and/or a convex slope on the bottom surface. In some embodiments, the horizontal stabilizer may be mounted on the aft end of a rotorcraft. By obviating the need for slats, such a horizontal stabilizer design reduces complexity without a performance penalty, thus resulting in a more cost-efficient and reliable solution. Moreover, eliminating the slats similarly eliminates the need to provide anti-icing for the slats, thus providing a further reduction in complexity.

Moreover, certain embodiments of a vertical stabilizer may be designed to provide strong aerodynamic performance. Such a vertical stabilizer may use a tailored airfoil design that satisfies various design criteria, including strong aerodynamic performance (e.g., yaw stability, anti-torque control, minimal flow separation and drag). In some embodiments, for example, the vertical stabilizer may have a cambered airfoil shape that provides the requisite yaw stability and anti-torque control while also minimizing flow separation and drag. The cambered airfoil shape, for example, may enable the vertical stabilizer to provide a portion of the anti-torque required in forward flight (e.g., reducing the anti-torque requirements and power consumption of the tail rotor), and/or may also provide sufficient anti-torque to allow continued flight in the event of a tail rotor failure. The cambered airfoil shape may also enable the vertical stabilizer to provide sufficient aerodynamic sideforce to offset the tail rotor thrust in forward flight, thus minimizing tail rotor flapping and cyclic loads and maximizing the fatigue life of components. Moreover, in some embodiments, the vertical stabilizer may have a blunt trailing edge (rather than a pointed trailing edge) in order to reduce the thickness tapering on the aft end without modifying the desired chord length, thus minimizing flow separation and drag while also reducing manufacturing complexity.

It should be appreciated that rotorcraft 100 of FIG. 1 is merely illustrative of a variety of aircraft that can be used with embodiments described throughout this disclosure. Other aircraft implementations can include, for example, fixed wing airplanes, hybrid aircraft, tiltrotor aircraft, unmanned aircraft, gyrocopters, a variety of helicopter configurations, and drones, among other examples.

As described above, helicopters require horizontal and vertical stabilization during forward flight. In accordance with features of embodiments described herein, portions of horizontals and vertical stabilization structures (such as horizontal stabilizers 150 and vertical stabilizers 160) may be combined into a structure referred to herein as an inverted V-tail (which, as used herein, includes a pair of inverted V-tail stabilizers comprising airfoils) that may perform certain aspects of both horizontal and vertical stabilization. In accordance with features of embodiments described herein, a conventional tail rotor for a rotorcraft may be provided with a tail rotor shroud integrated with one or more inverted V-tails.

Figure 2A:
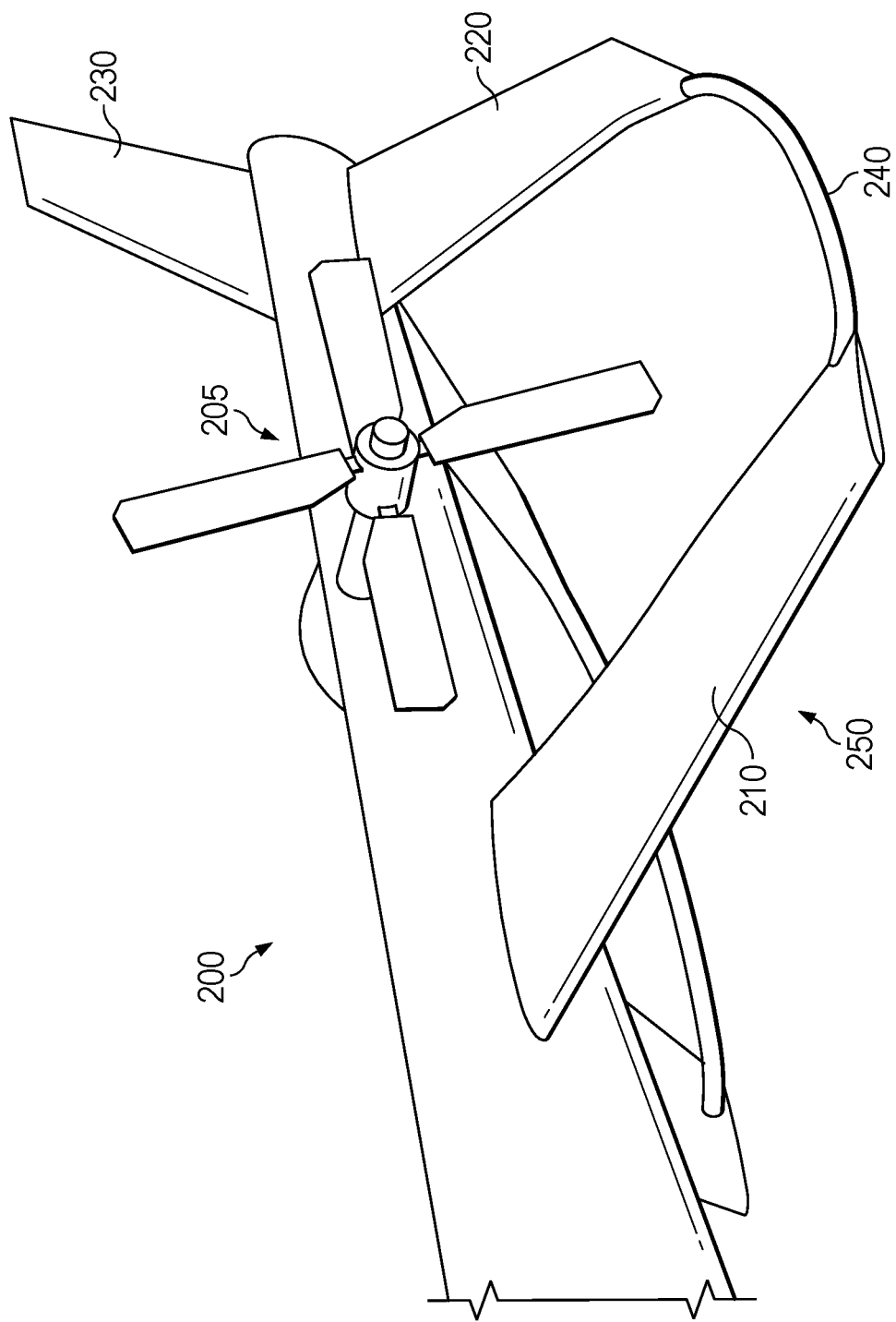
FIGS. 2A and 2B respectively illustrate a perspective view and a top plan view of a portion of an aircraft empennage including a tail rotor shroud in accordance with features of embodiments described herein.
Figure 2B:
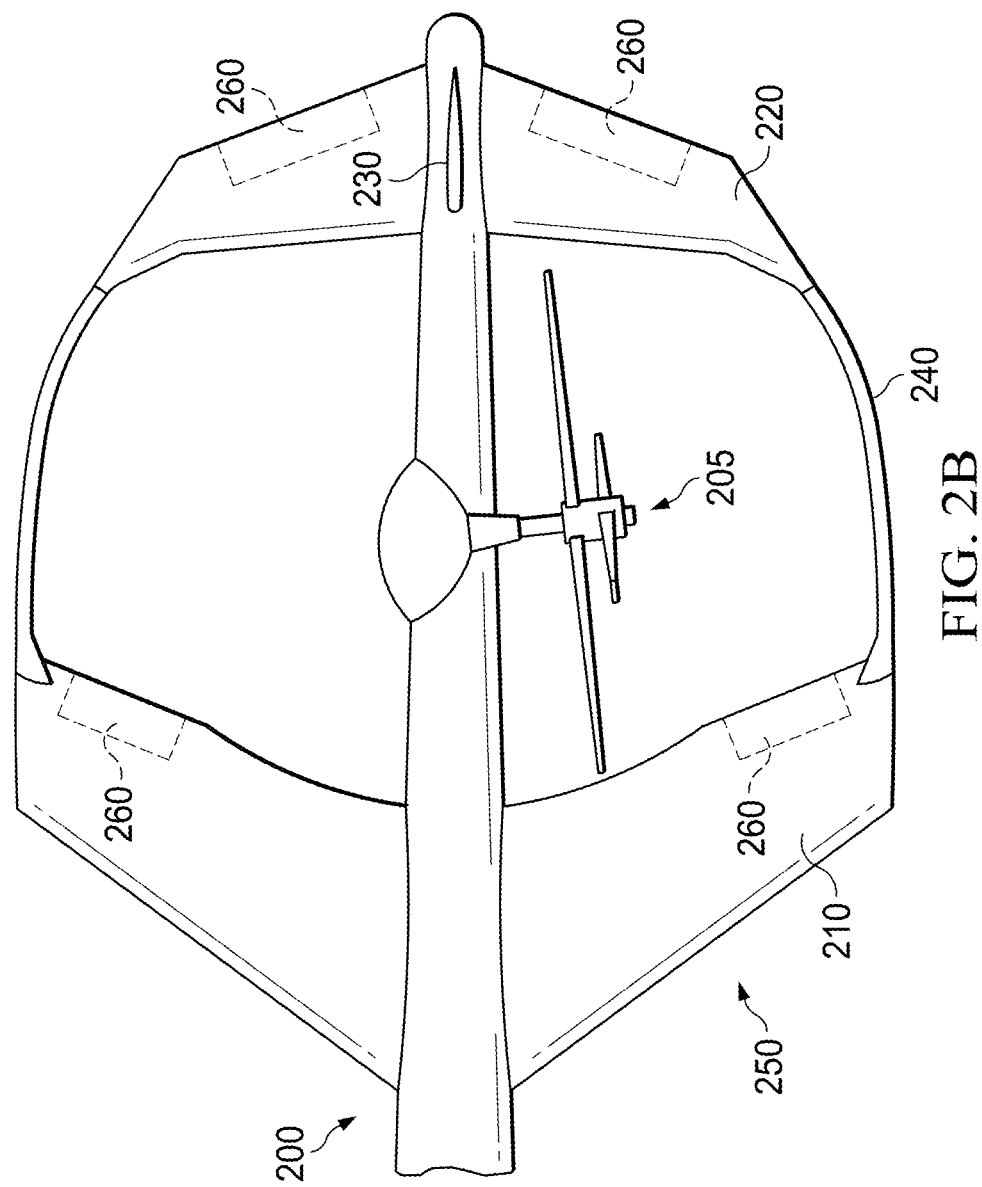

FIGS. 2A and 2B respectively illustrate a perspective view from the port side and a top plan view of a portion of an aircraft empennage 200 including features of embodiments described herein. As shown in FIGS. 2A and 2B, connected to the empennage 200 is a tail rotor 205, a forward inverted V-tail stabilizer 210 disposed forward of the tail rotor and an aft inverted V-tail stabilizer 220 disposed aft of the tail rotor. In the illustrated embodiment, a vertical stabilizer 230 may also be connected to a top aft end of the empennage 200. A shroud bar 240 extends between the forward inverted V-tail stabilizer 210 and the aft inverted V-tail stabilizer 220 such that the forward end of the shroud bar is connected to the outboard end of the forward inverted V-tail stabilizer 210 and the aft end of the shroud bar is connected to the outboard end of the aft inverted V-tail stabilizer 220. The combination of the inverted V-tail stabilizers 210, 220, and the shroud bar 240 comprise a tail rotor shroud 250. Although not labeled with reference numerals, a similar tail rotor shroud structure is similarly connected to the opposite side of the empennage 200 (i.e., the side of the empennage opposite the side to which the tail rotor 205 is connected).

In accordance with features of embodiments described herein, the inverted V-tail stabilizers 210, 220, extend downward from the empennage 200 at an angle such that the shroud bar 240 is at an appropriate height to protect aircraft ground personnel, passengers, and/or other individuals, as described in greater detail below. In the illustrated embodiment, the shroud bar 240 extends below the tail rotor 205 to provide ground strike protection. As best illustrated in FIG. 2B, in the example embodiment, the inverted V-tails including the inverted V-tail stabilizers 210, 220, may be generally symmetrical (i.e., similar or identical on both port and starboard sides of the empennage 200) to provide balanced ground strike protection. In alternative embodiments, as will be described below, the inverted V-tails may be asymmetrical.

The angle and size (e.g., length and width) of the inverted V-tail stabilizers 210, 220, can be tailored for different aircraft to optimize both the horizontal and vertical component of stabilization and height of the shroud bar 240 to optimize protection from the tail rotor 205. It will be recognized that the vertical stabilizer 230 may be unnecessary depending on the vertical and horizontal stabilization provided by the inverted V-tail stabilizers 210, 220, but may be included for implementations in which more vertical stabilization is necessary. It will be recognized that the specific physical and aerodynamic characteristics of the inverted V-tails comprising the inverted V-tail stabilizers 210, 220, may be dictated by physical, aerodynamic, and other characteristics of the aircraft for which they are designed to be used.

Figure 3A:
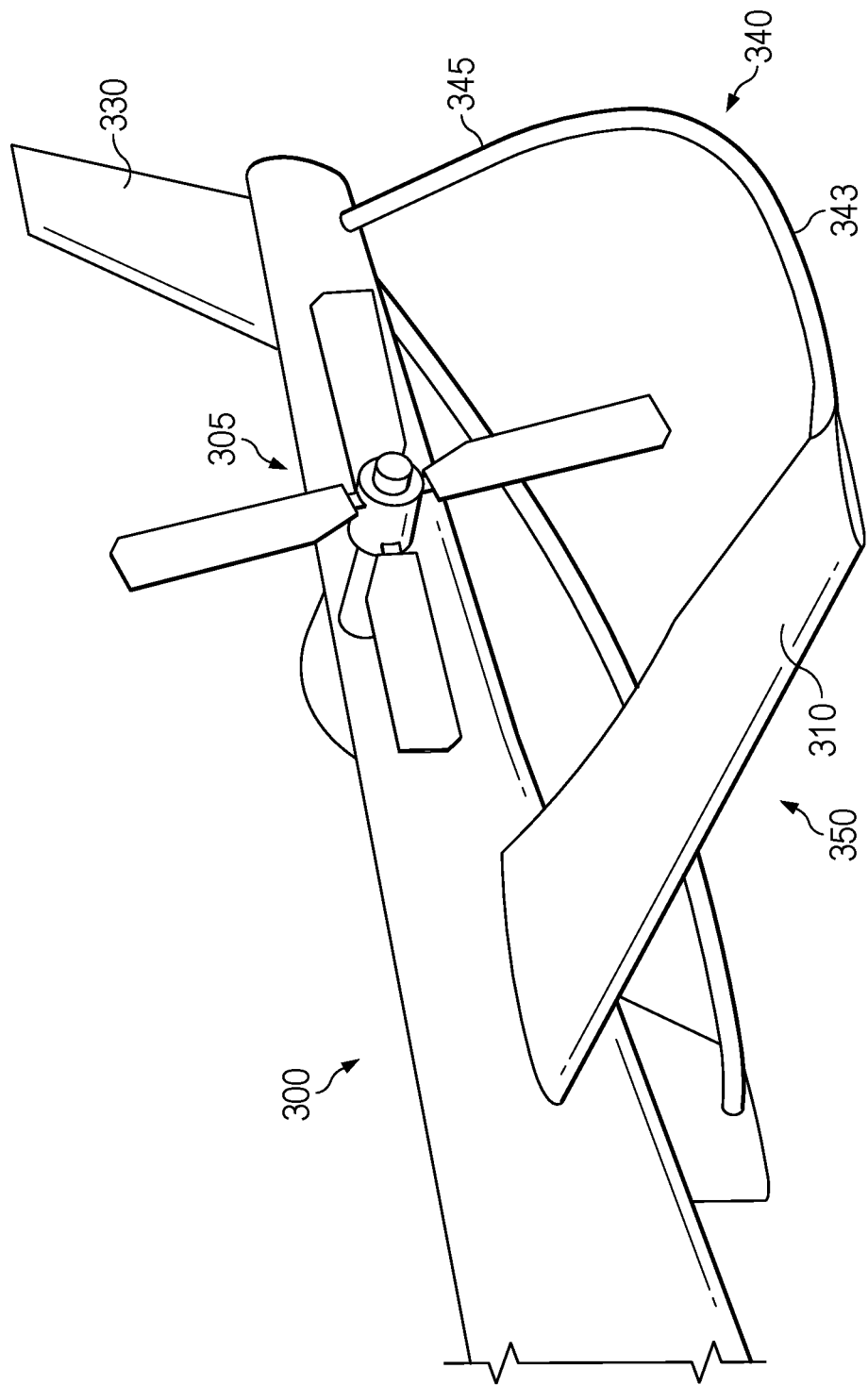
FIGS. 3A and 3B respectively illustrate a perspective view and a top plan view of an alternative embodiment of an aircraft empennage including a tail rotor shroud in accordance with features of embodiments described herein.
Figure 3B:
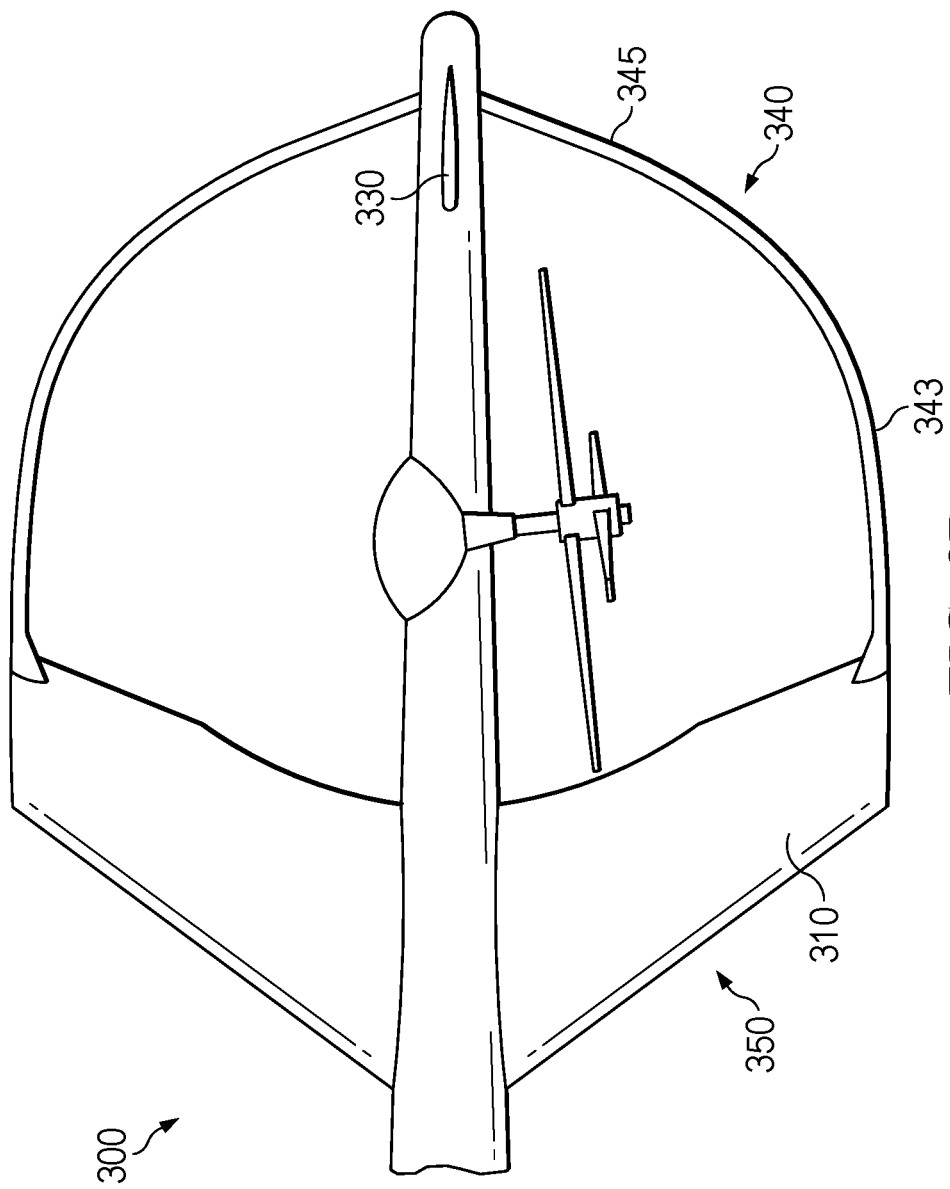

FIGS. 3A and 3B respectively illustrate a perspective view from the port side and a top plan view of an alternative embodiment of an aircraft empennage 300 which is similar to the empennage 200 (FIGS. 2A and 2B) in that it has connected thereto a tail rotor 305, a forward inverted V-tail stabilizer 310 disposed forward of the tail rotor, an optional vertical stabilizer 330, and a shroud bar 340; however, in the embodiment illustrated in FIGS. 3A and 3B, the shroud bar 340 includes a horizontal portion 343 and a vertical portion 345. A first end of the shroud bar 340 comprising the horizontal portion 343 is connected to an outboard end of the forward inverted V-tail stabilizer 310 and a second end of the shroud bar comprising the vertical portion 345 of the shroud bar is connected directly to the corresponding side of the body of the empennage 300 proximate an aft end thereof (e.g., below the vertical stabilizer 330). In contrast to the embodiment illustrated in FIGS. 2A and 2B, the embodiment illustrated in FIGS. 3A and 3B lacks an aft inverted V-tail stabilizer. The combination of the inverted V-tail stabilizer 310 and the shroud bar 340 comprise a tail rotor shroud 350. Although not labeled with reference numerals, a similar tail rotor shroud structure is similarly connected to the opposite side of the empennage 300 (i.e., the side of the empennage opposite the side to which the tail rotor 305 is connected).

In accordance with features of embodiments described herein, the inverted V-tail stabilizer 310 extends downward from the empennage 300 at an angle such that the horizontal portion 343 of the shroud bar 340 is at an appropriate height to protect aircraft ground personnel, passengers, and/or other individuals. In the illustrated embodiment, the shroud bar 340 extends below the tail rotor 305 to provide ground strike protection. As best illustrated in FIG. 3B, the inverted V-tail comprising the tail rotor shroud structure is generally symmetrical (i.e., similar or identical on both port and starboard sides of the empennage 300) to provide balanced ground strike protection. In alternative embodiments, as will be described below, the inverted V-tail may be asymmetrical.

The angle and size of the inverted V-tail stabilizer 310 can be tailored for different aircraft to optimize both the horizontal and vertical component of stabilization and height of the shroud bar 340 to optimize protection from the tail rotor 305. It will be recognized that the vertical stabilizer 330 may be unnecessary depending on the vertical and horizontal stabilization provided by the inverted V-tail stabilizer 310 but may be included for implementations in which more vertical stabilization is necessary.

Alternative embodiments may include movable forward inverted V-tail stabilizers, movable aft inverted V-tail stabilizers, and/or movable control surfaces 260 (e.g., ruddervators) integrated into one or both inverted V-tail stabilizers (as best shown in FIG. 2B) to add stability and control over fixed stabilizers.

Figure 4A:
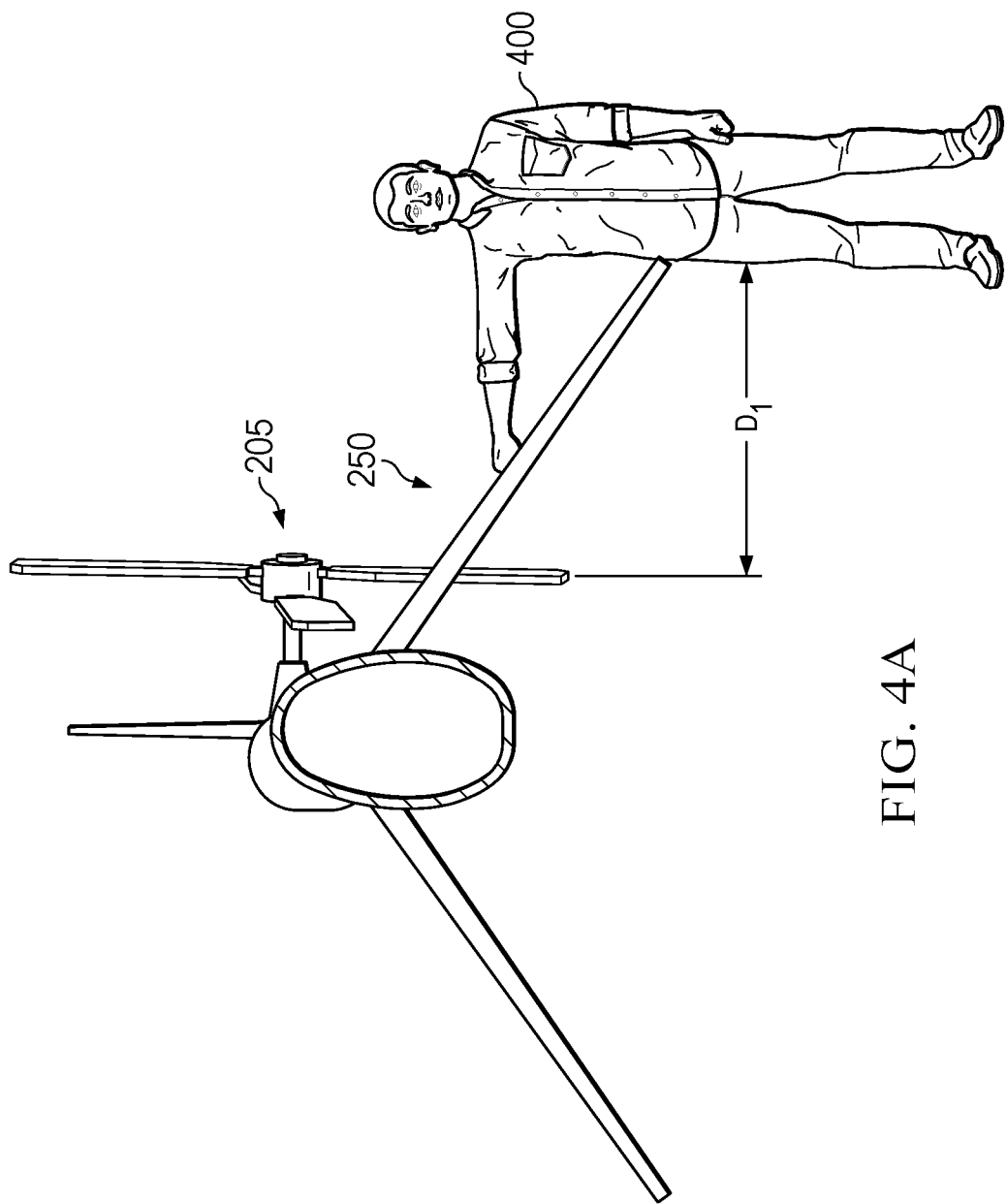
FIGS. 4A and 4B illustrate operation of a tail rotor shroud to protect an individual from unintentional contact with a tail rotor in accordance with features of embodiments described herein.
Figure 4B:
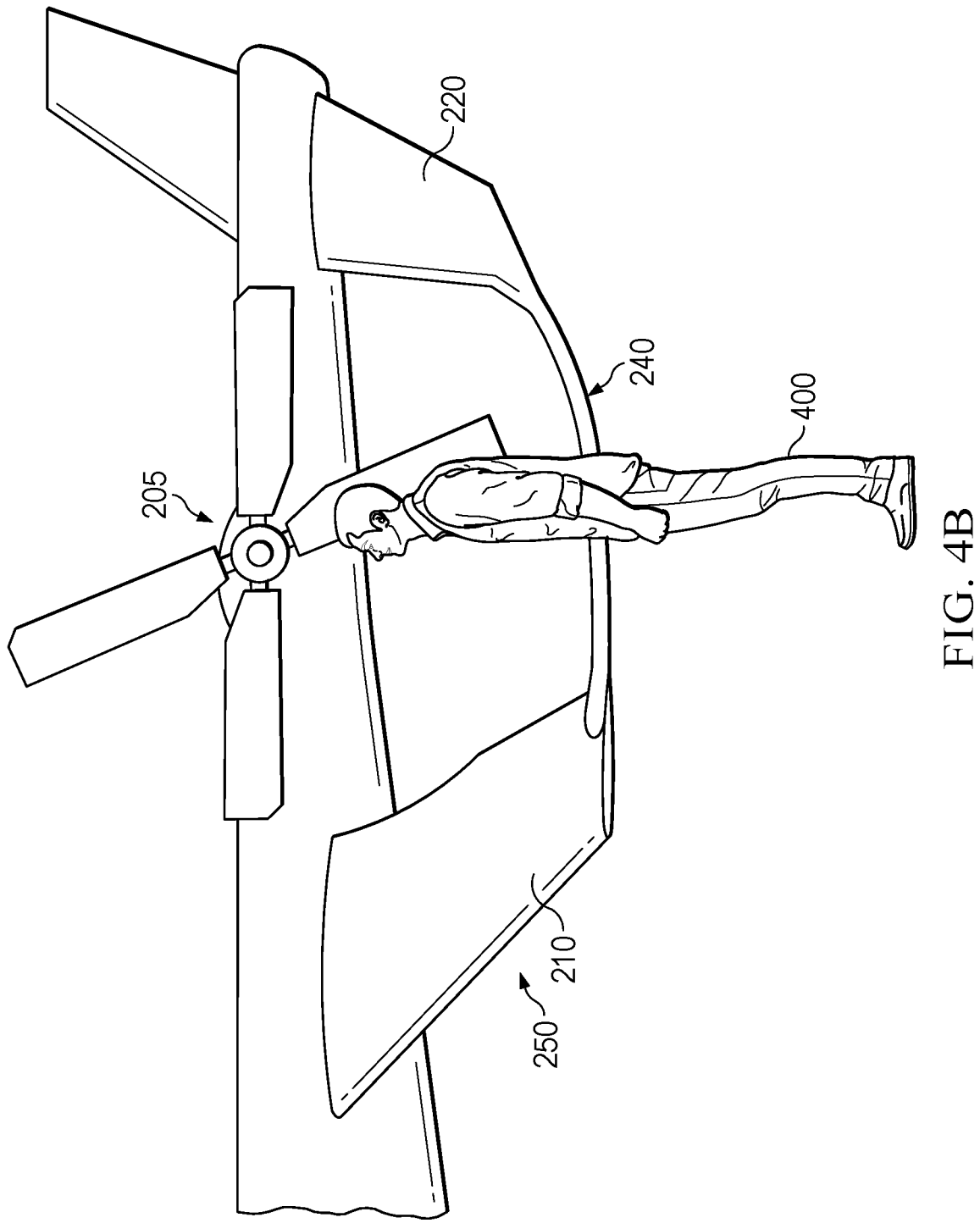

Using the inverted V-tail stabilizer(s) as a primary component of the tail rotor shroud is more weight efficient than including an independent rotor shroud in addition to convention horizontal and vertical stabilizers, since the stabilization function performed by the inverted V-tail stabilizer(s) is necessary for stabilization and control of the aircraft. As illustrated in FIGS. 4A and 4B, the shroud bar is designed such that the shroud bar 240 (or horizontal portion thereof) maintains an individual 400 a safe distance D1 from the tail rotor 205, thus preventing the individual from accidentally extending an arm into the tail rotor. In an example embodiment, D1 is greater than the length of a human arm. Additionally and/or alternatively, D1 may be in the range of 30-40 inches.

Additionally, as noted above, embodiments of the tail rotor shroud shown in FIGS. 2A-3B extend lower than the tail rotor disk, which makes it a very good ground strike protection device. Moreover, the design enables the more efficient operation of the tail rotor, as it causes less blockage in the tail rotor air column cylinder than other types of shrouds. Additionally, the amount of vertical and horizontal stabilization provided by the inverted V-tail stabilizer(s) of the tail rotor shroud may be optimized in concert with the shroud bar height and distance from the tail rotor for optimal safety. Other embodiments allow for active control of the inverted V-tail stabilizer(s) to provide more stability and control and still providing excellent protection from the tail rotor.

Figure 5A:
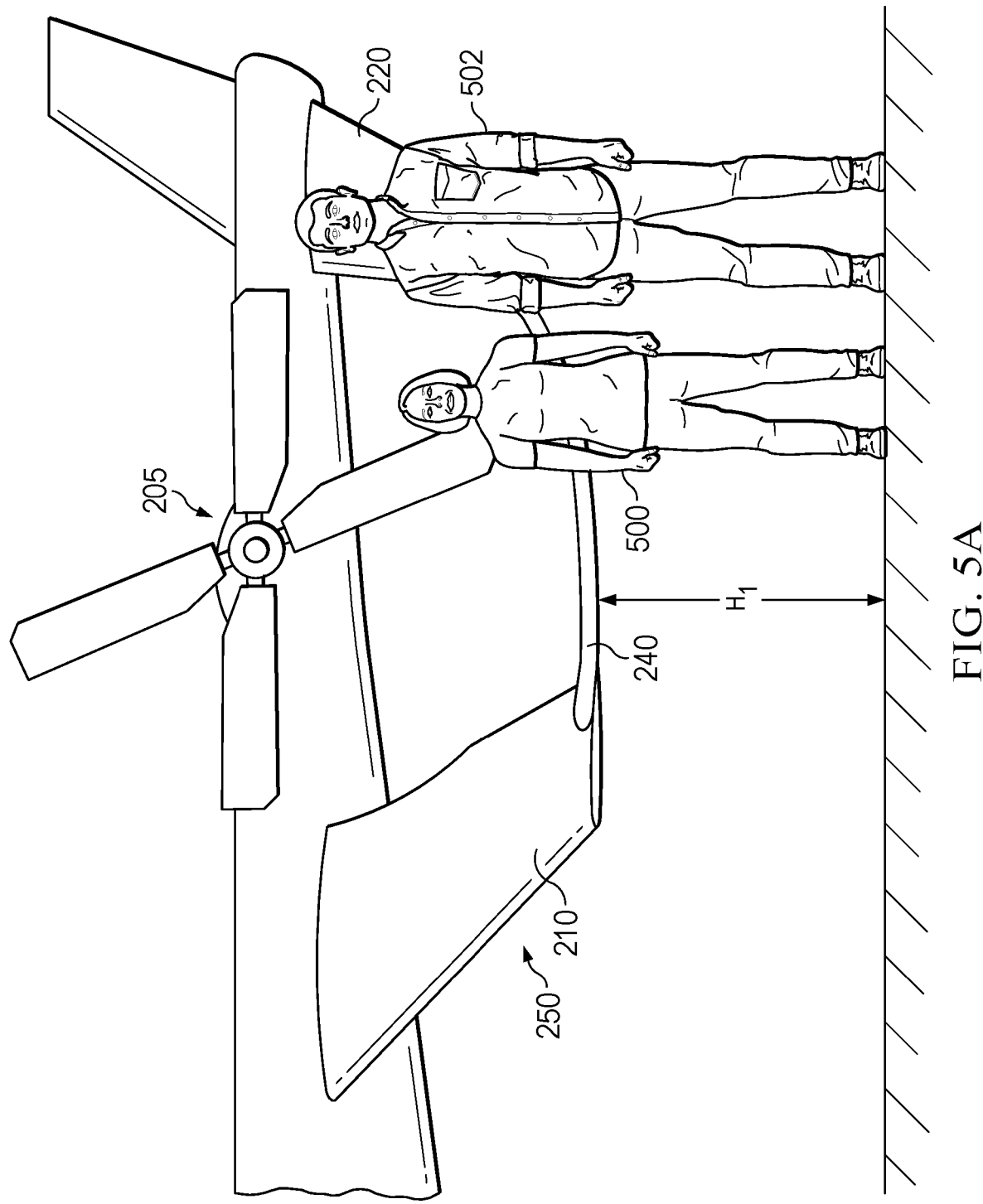
FIGS. 5A and 5B illustrate positioning of a shroud bar of a tail rotor shroud to protect an individual from unintentional contact with a tail rotor in accordance with features of embodiments described herein.
Figure 5B:
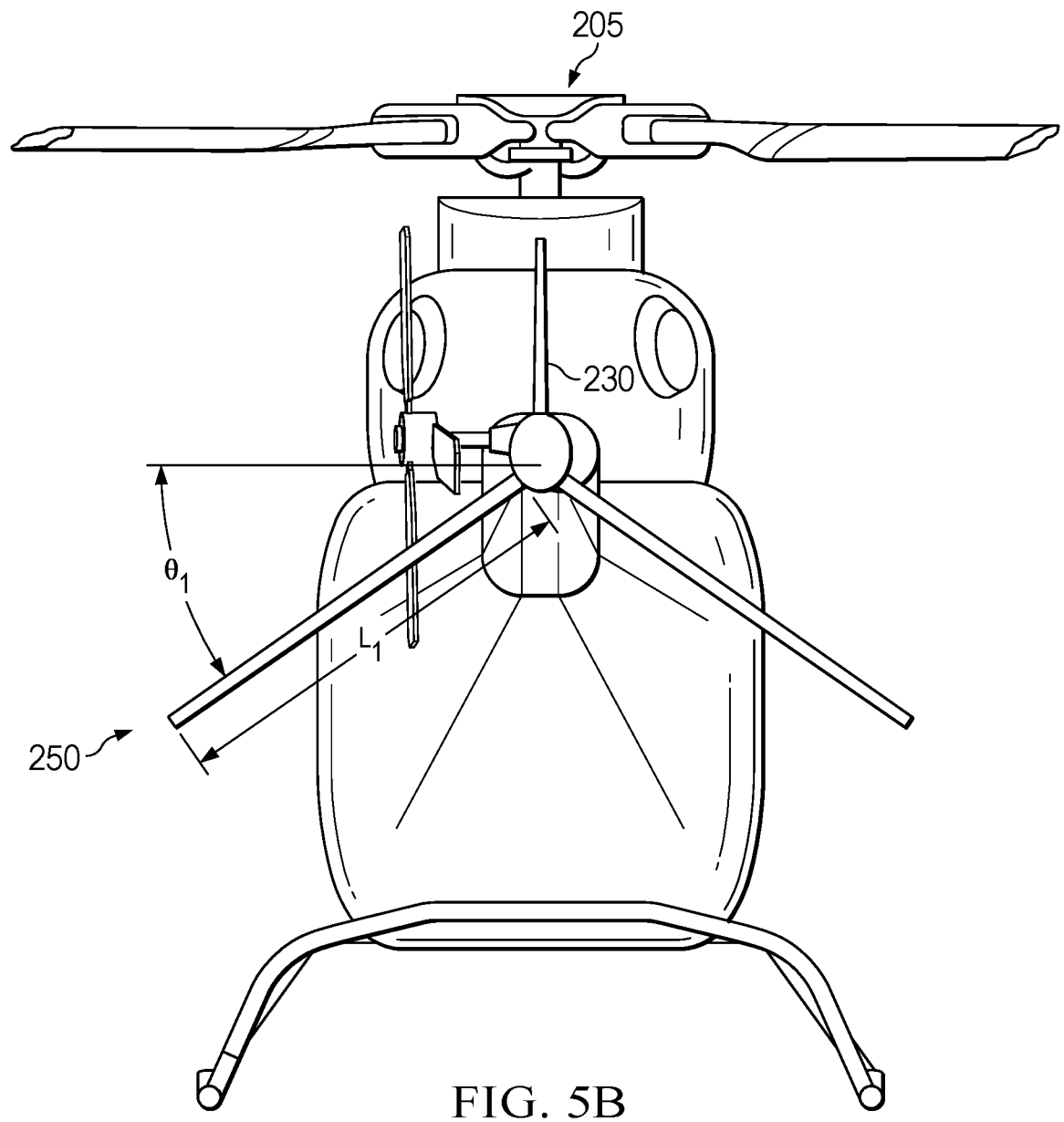

Referring to FIGS. 5A and 5B, the lengths (e.g., length L1) and angles (e.g., angle Θ1) from horizontal of the inverted V-tail stabilizers of the tail rotor shroud 250 may be designed such that a height H1 of the shroud bar 240 from the ground impedes aircraft ground personnel, passengers, and/or other individuals of various heights from extending an arm into the tail rotor 205. As shown in FIG. 5A, the rotor shroud 250 may be designed to accommodate a person 500 having a height less than that of an average adult (e.g., equivalent to the $5^{th}$ percentile of adult height) and a person 510 having a height greater than that of an average adult (e.g., equivalent to the $95^{th}$ percentile of adult height). In an example embodiment, H1 may be within the range of 36-48 inches. In another example embodiment, Θ1 may be within the range of 25-45 degrees. L1 may be within the range of 50-75 inches.

Figure 6A:
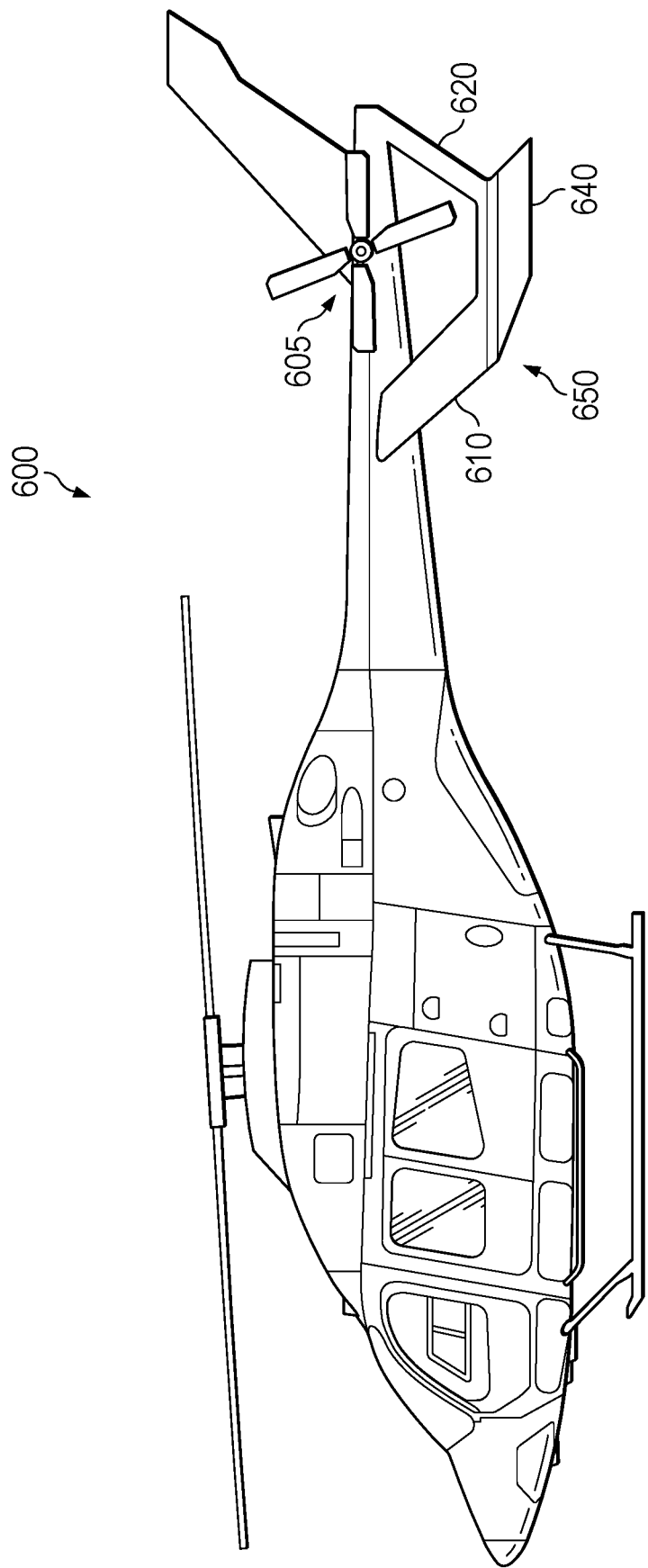
FIGS. 6A-6C respectively illustrate a side plan view, a top plan view, and a rear plan view of an aircraft having a tail rotor shroud in accordance with features of embodiments described herein.
Figure 6B:
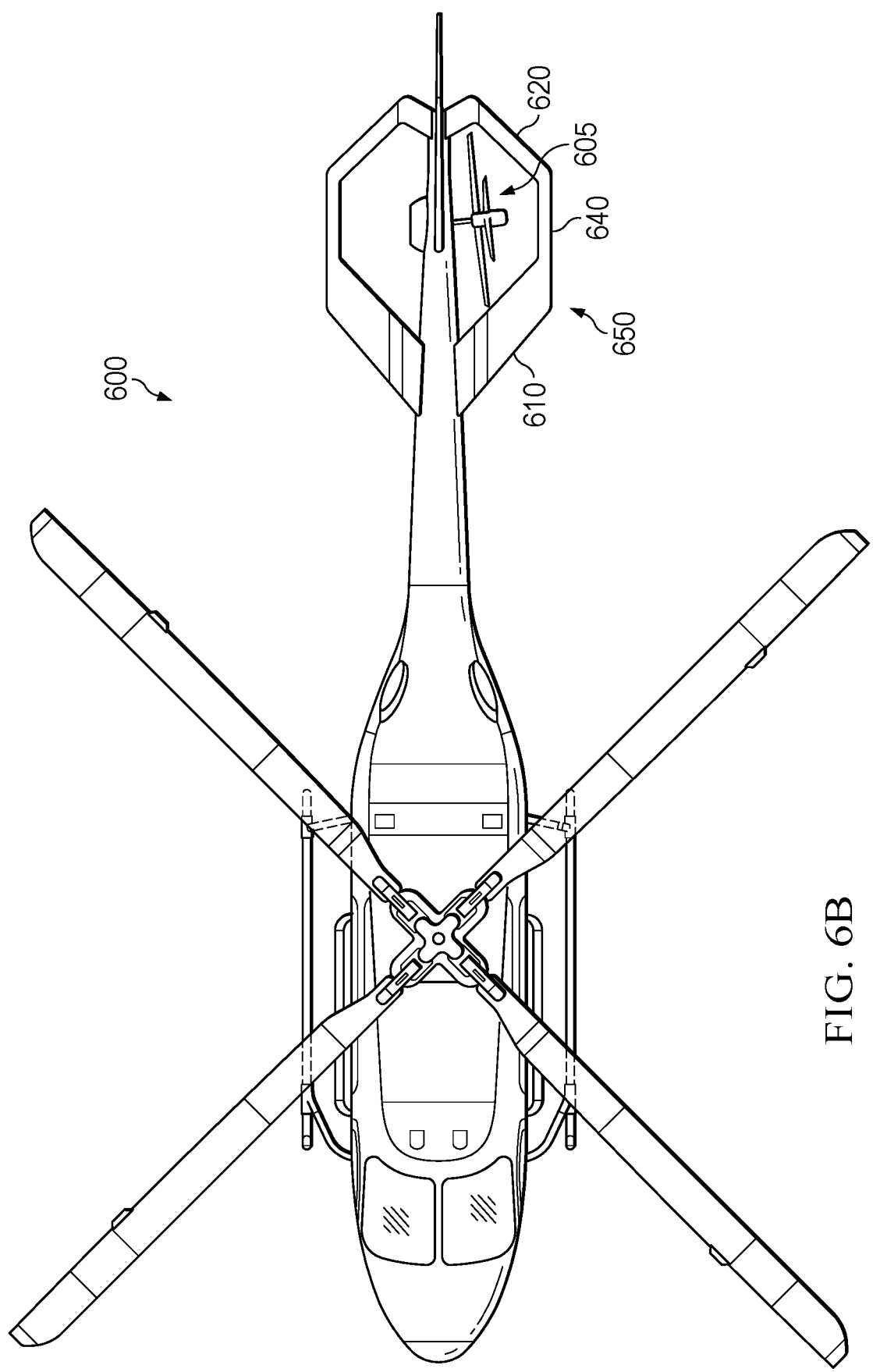
Figure 6C:
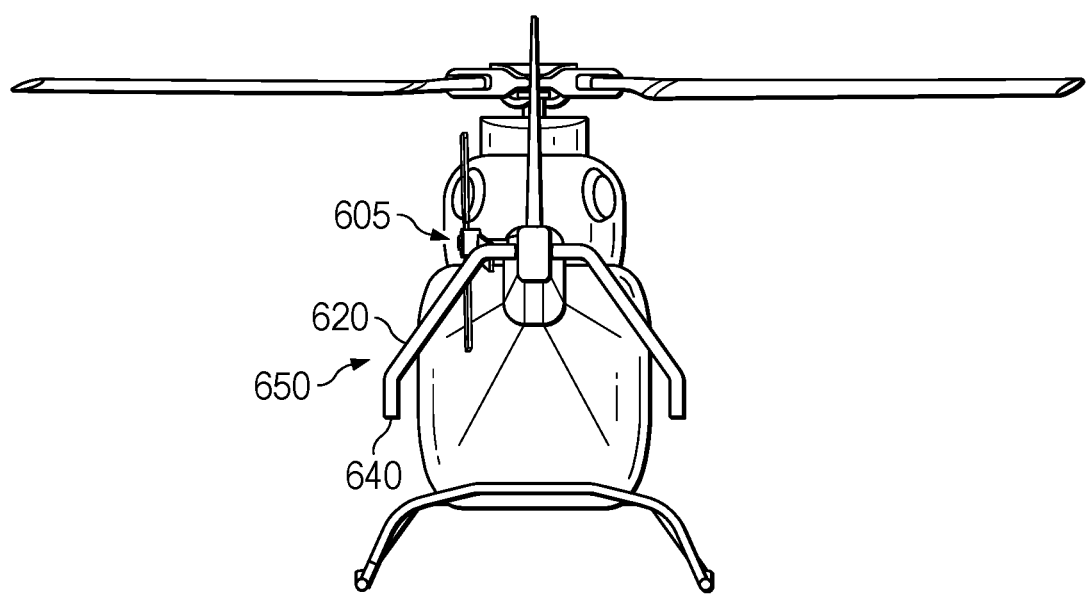

FIGS. 6A-6C respectively illustrate a side plan view, a top plan view, and a rear plan view of an aircraft 600 including features of embodiments described herein. As shown in FIGS. 6A-6C, the aircraft 600 includes a tail rotor 605, a forward inverted V-tail stabilizer 610 disposed forward of the tail rotor and an aft connector structure 620 disposed aft of the tail rotor. In the illustrated embodiment, a vertical stabilizer 630 may also be connected to a top aft end of the empennage of the aircraft 600. A shroud structure 640 extends between the forward inverted V-tail stabilizer 610 and the aft connector structure 620 such that the forward end of the shroud structure is connected to the outboard end of the forward inverted V-tail stabilizer 610 and the aft end of the shroud structure is connected to the outboard end of the aft connector structure 620. The combination of the inverted V-tail stabilizer 610, the aft connector structure 620, and the shroud structure 640 comprise a tail rotor shroud 650. Although not labeled with reference numerals, a similar tail rotor shroud structure is similarly connected to the opposite side of the empennage of the aircraft 600 (i.e., the side of the empennage opposite the side to which the tail rotor 605 is connected).

In accordance with features of embodiments described herein, the inverted V-tail stabilizer 610 and connector structure 620 extend downward from the empennage of the aircraft 600 at an angle such that the shroud structure 640 is at an appropriate height to protect aircraft ground personnel, passengers, and/or other individuals, as described in greater detail above. In the illustrated embodiment, the inverted V-tail including the inverted V-tail stabilizer 610, may be generally symmetrical (i.e., similar or identical on both port and starboard sides of the empennage of the aircraft 600). In alternative embodiments, the inverted V-tail may be asymmetrical.

Figure 7A:
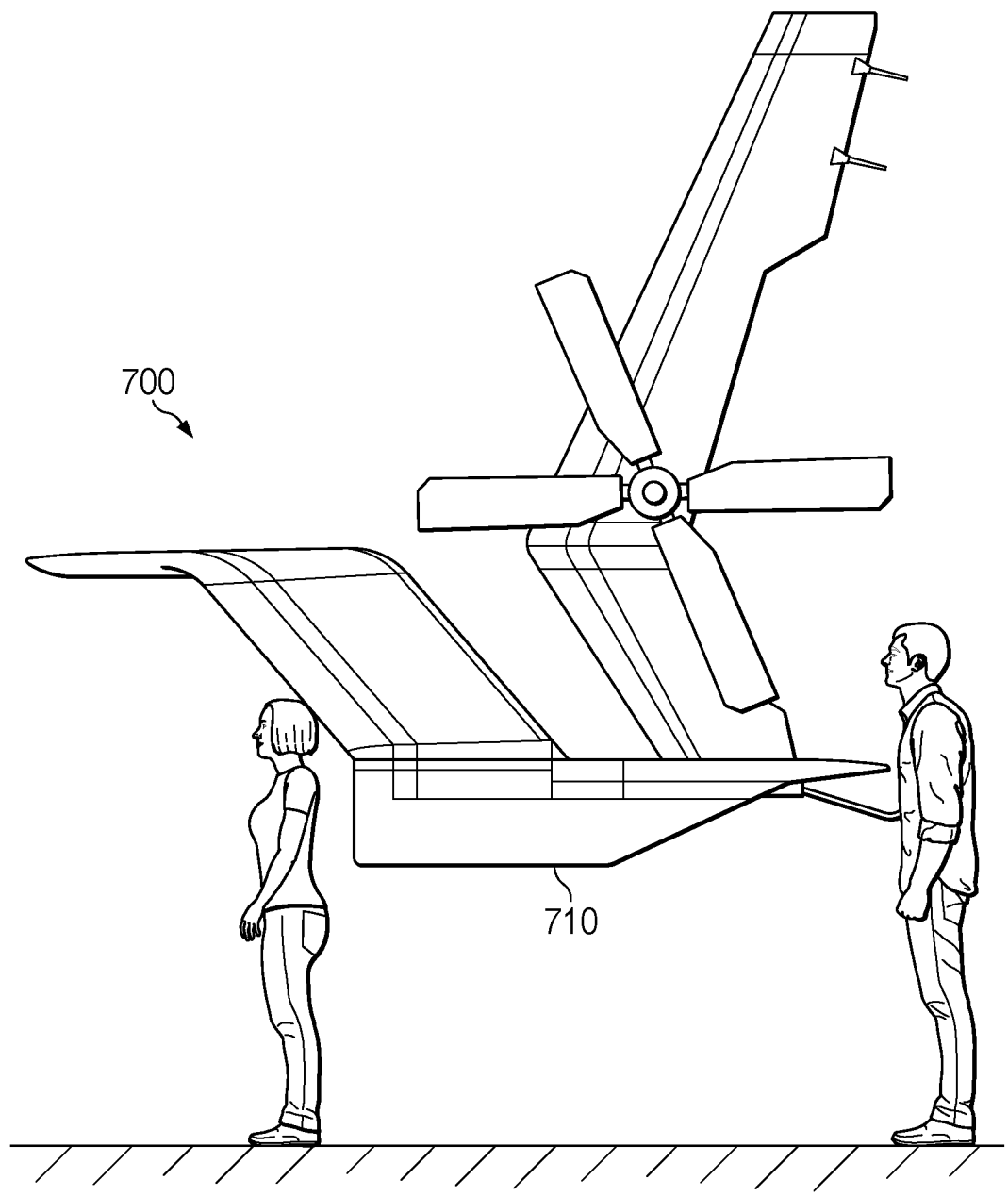
FIGS. 7A and 7B illustrate an alternative tail rotor shroud that may be substituted for the tail rotor shroud of FIGS. 6A-6C.
Figure 7B:
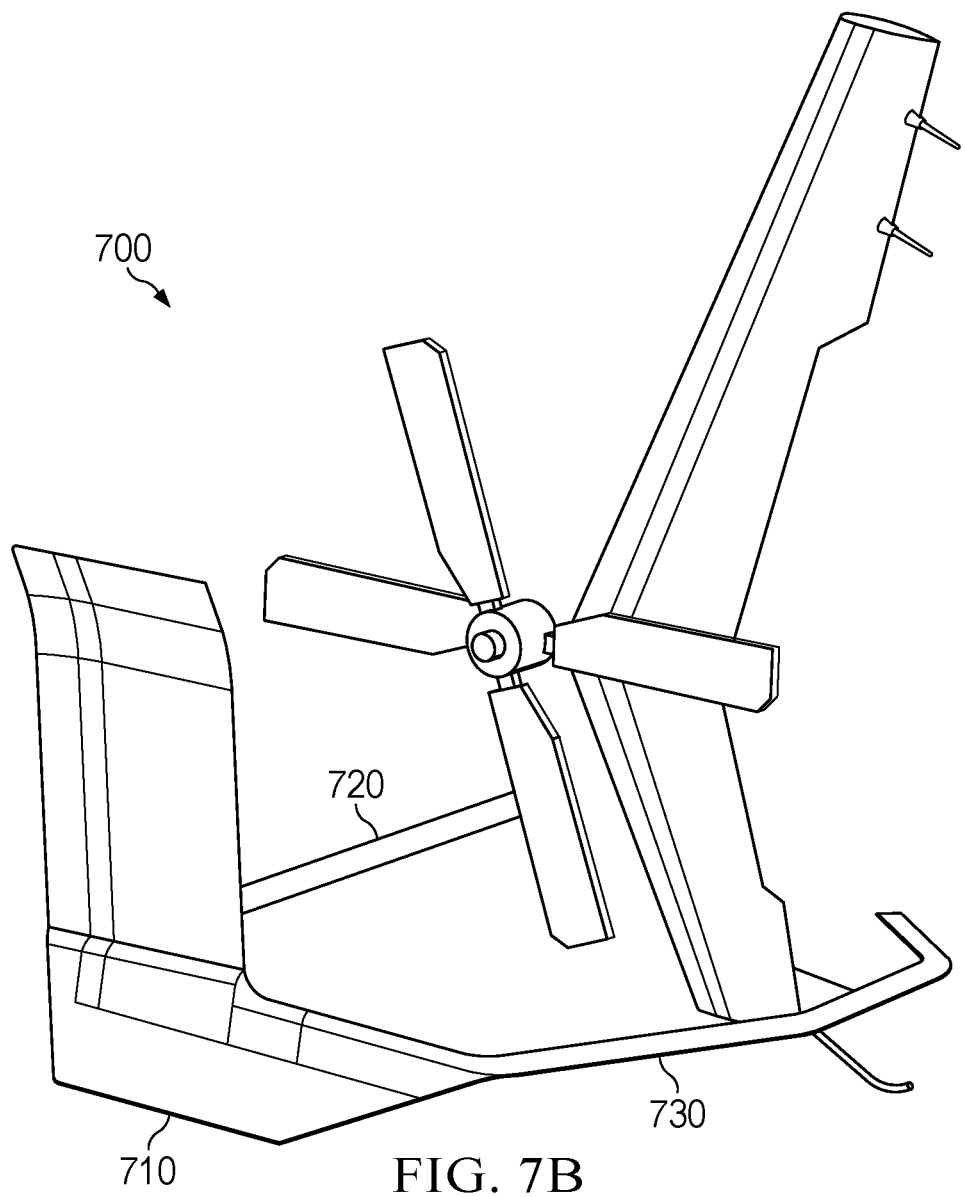

FIGS. 7A and 7B illustrate an alternative tail rotor shroud 700 that may be substituted for the tail rotor shroud 650 (FIG. 6A) of the aircraft 600 (FIG. 6A). As shown in FIGS. 7A and 7B, a shroud structure 710 of the tail rotor shroud 700 is a different shape than the shroud structure 640 (FIG. 6A) of the tail rotor shroud 650 (FIG. 6A) and may address different tail rotor safety concerns and/or provide different aerodynamic performance based on the shape. As shown in FIG. 7B, tail rotor shroud 700 includes a forward guard 720 and an aft guard 730 positioned relative to the tail rotor such that a person whose height is less than the height-from-ground of the guards 720, 730, (e.g., approximately 57 inches) would not be hit by the bottom of the tail rotor should the person walk under one of the guards.

Figure 8A:
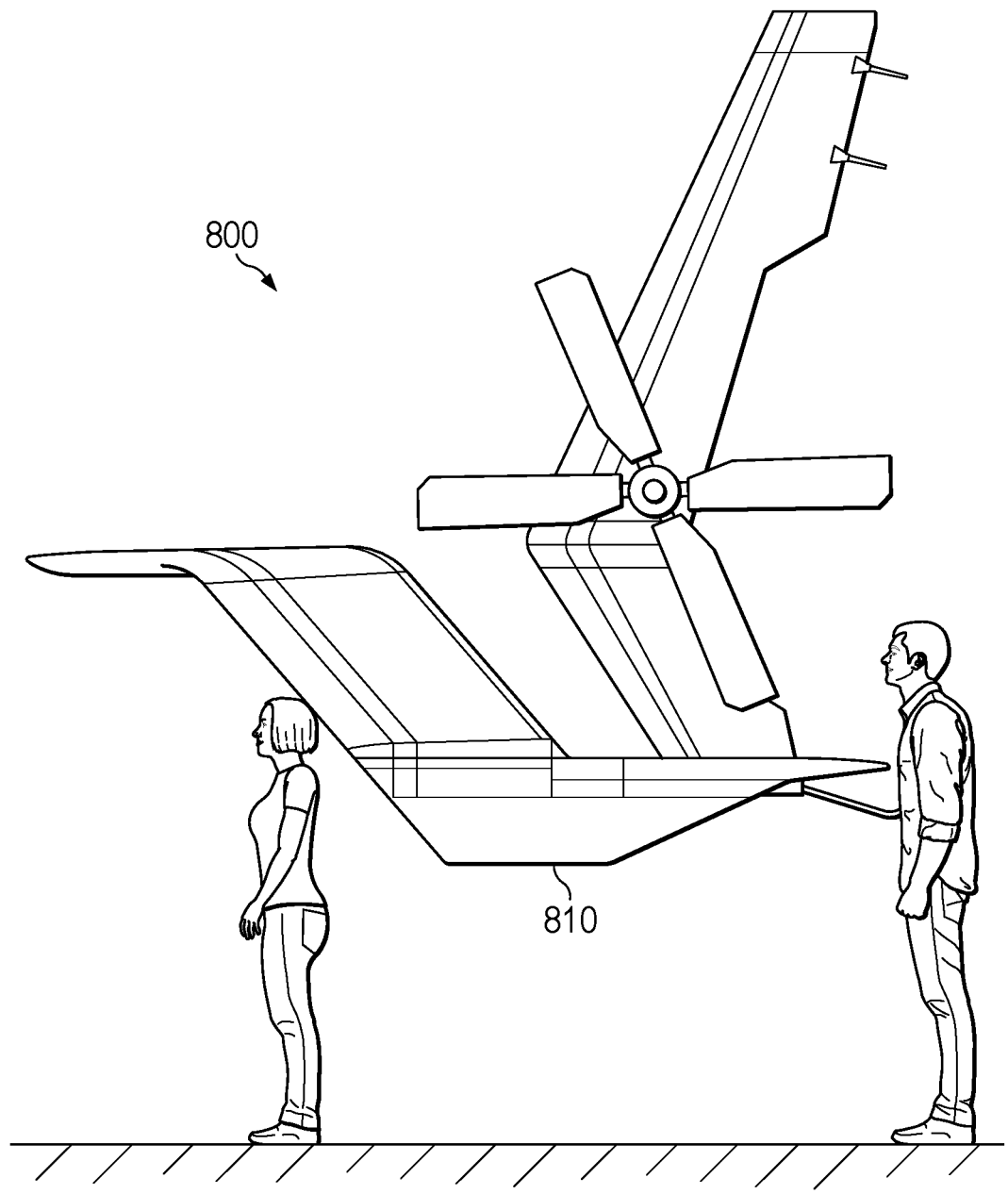
FIGS. 8A and 8B illustrate an alternative tail rotor shroud that may be substituted for the tail rotor shroud of FIGS. 6A-6C.
Figure 8B:
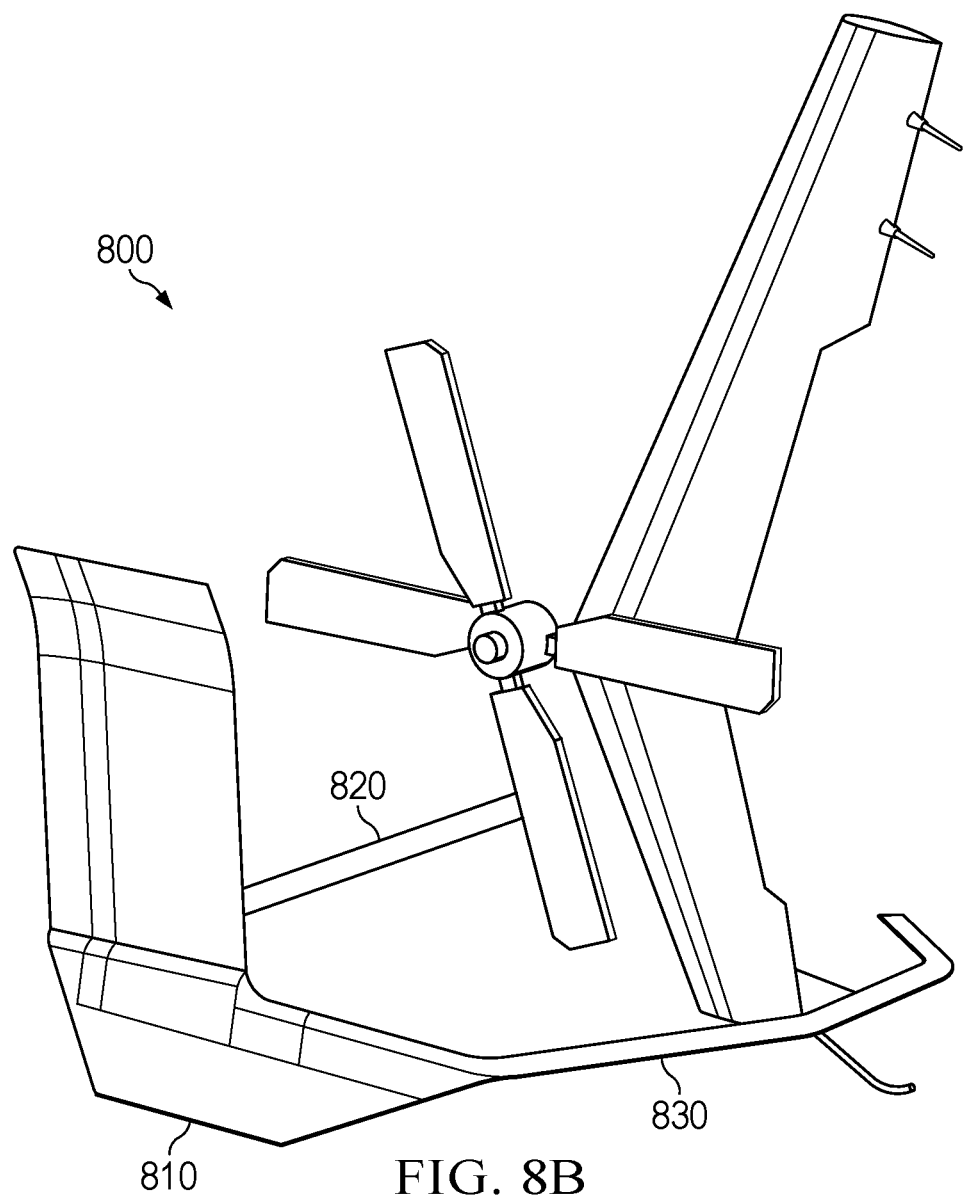

FIGS. 8A and 8B illustrate an alternative tail rotor shroud 800 that may be substituted for the tail rotor shroud 650 (FIG. 6A) of the aircraft 600 (FIG. 6A). As shown in FIGS. 8A and 8B, a shroud structure 810 of the tail rotor shroud 800 is a different shape than the shroud structure 640 (FIG. 6A) of the tail rotor shroud 650 (FIG. 6A) and may address different tail rotor safety concerns and/or provide different aerodynamic performance based on the shape. As shown in FIG. 8B, tail rotor shroud 800 includes a forward guard 820 and an aft guard 830 positioned relative to the tail rotor such that a person whose height is less than the height-from-ground of the guards 820, 830, (e.g., approximately 57 inches) would not be hit by the bottom of the tail rotor should the person walk under one of the guards.

Figure 9A:
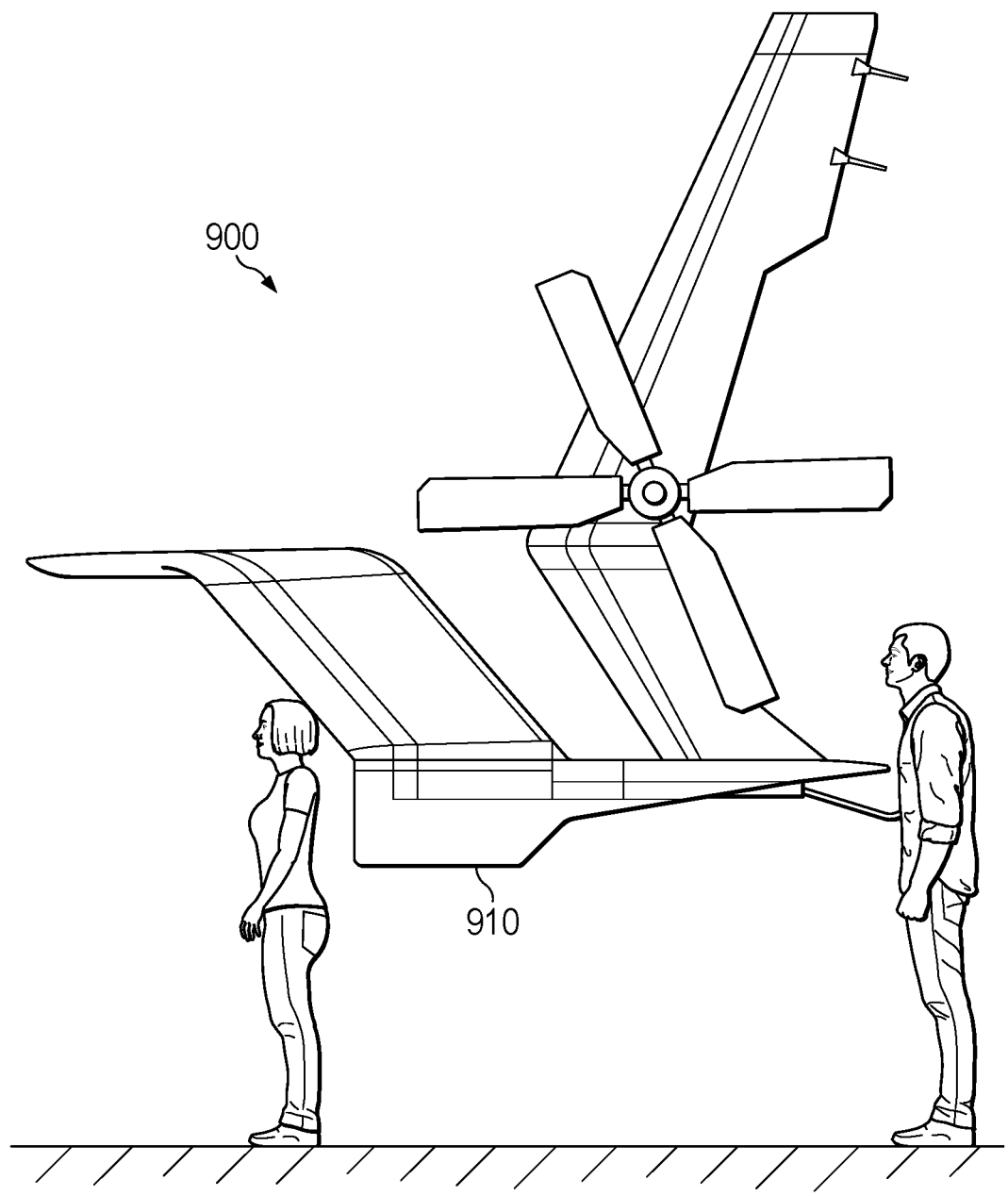
FIGS. 9A and 9B illustrate an alternative tail rotor shroud that may be substituted for the tail rotor shroud of FIGS. 6A-6C.
Figure 9B:
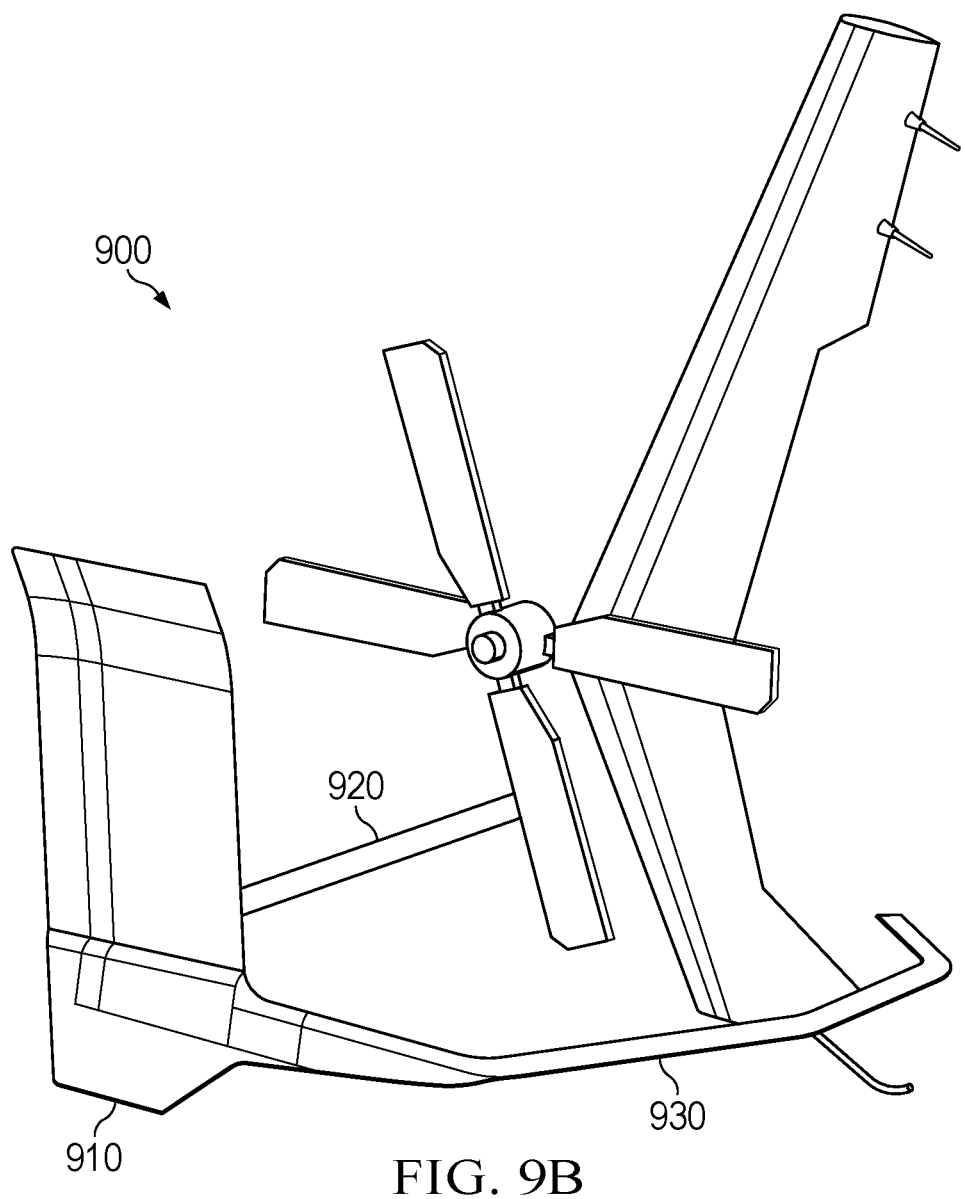

FIGS. 9A and 9B illustrate an alternative tail rotor shroud 900 that may be substituted for the tail rotor shroud 650 (FIG. 6A) of the aircraft 600 (FIG. 6A). As shown in FIGS. 9A and 9B, a shroud structure 910 of the tail rotor shroud 900 is a different shape than the shroud structure 640 (FIG. 6A) of the tail rotor shroud 650 (FIG. 6A) and may address different tail rotor safety concerns and/or provide different aerodynamic performance based on the shape. As shown in FIG. 9B, tail rotor shroud 900 includes a forward guard 920 and an aft guard 930 positioned relative to the tail rotor such that a person whose height is less than the height-from-ground of the guards 920, 930, (e.g., approximately 57 inches) would not be hit by the bottom of the tail rotor should the person walk under one of the guards.

Figure 10A:
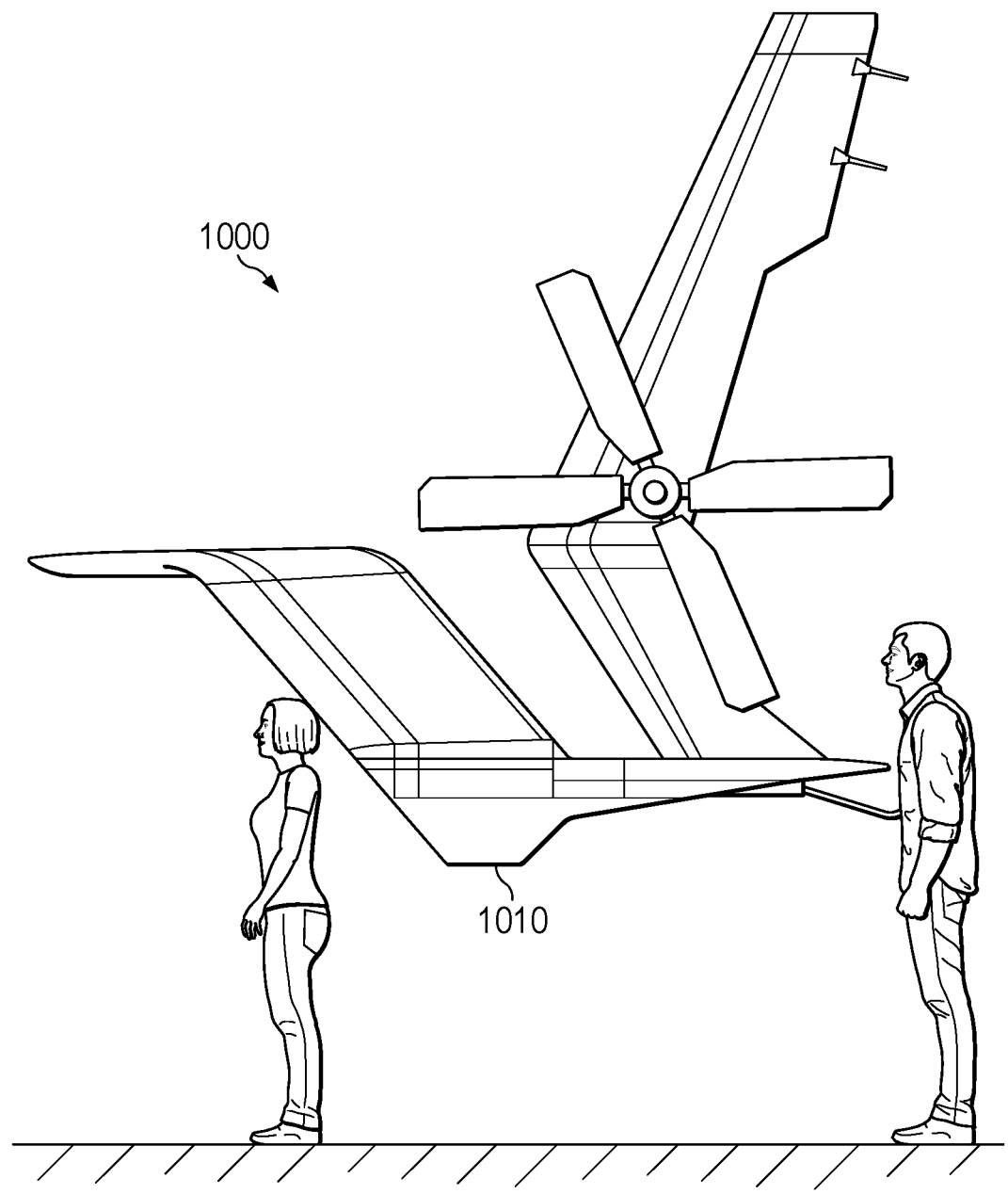
FIGS. 10A and 10B illustrate an alternative tail rotor shroud that may be substituted for the tail rotor shroud of FIGS. 6A-6C.
Figure 10B:
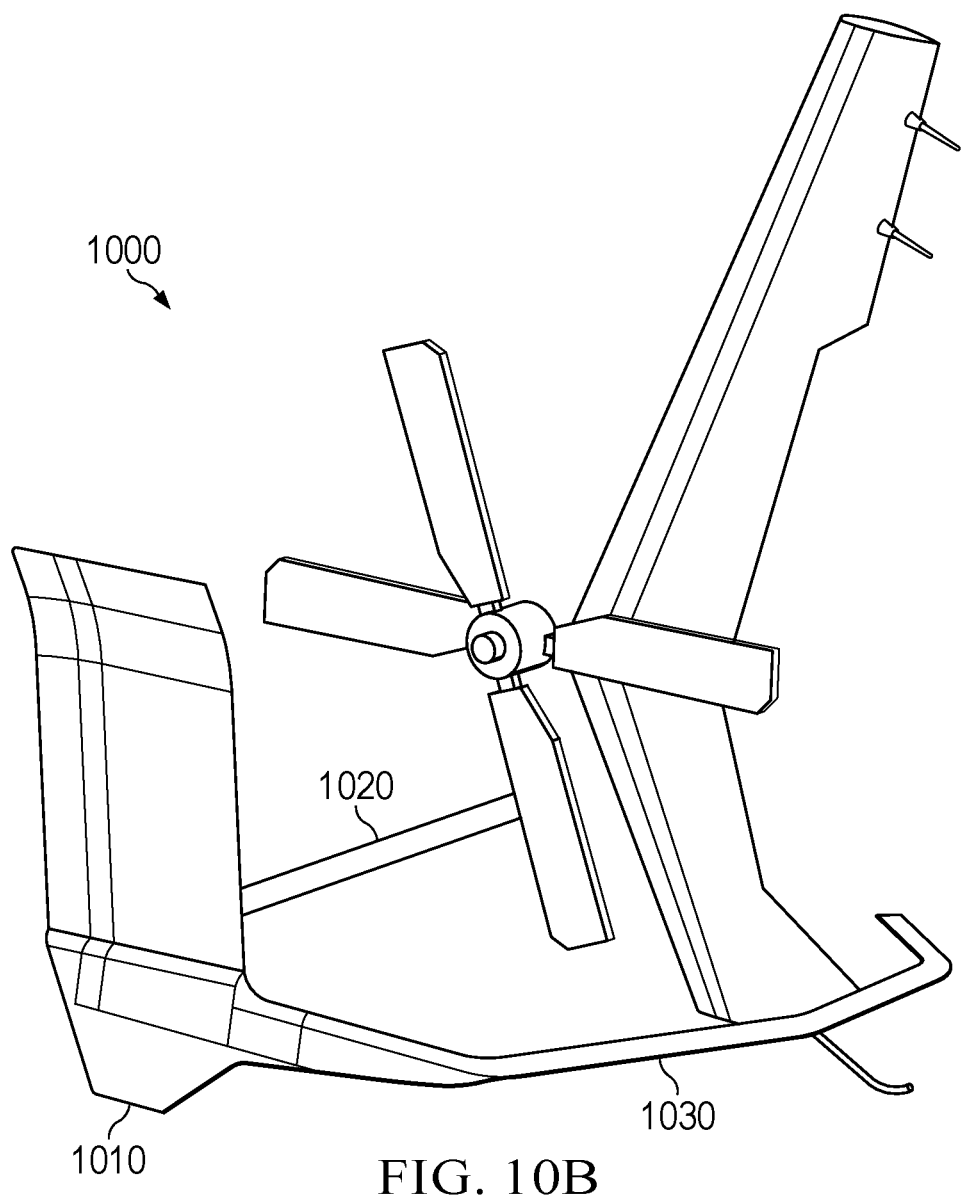

FIGS. 10A and 10B illustrate an alternative tail rotor shroud 1000 that may be substituted for the tail rotor shroud 650 (FIG. 6A) of the aircraft 600 (FIG. 6A). As shown in FIGS. 10A and 10B, a shroud structure 1010 of the tail rotor shroud 1000 is a different shape than the shroud structure 640 (FIG. 6A) of the tail rotor shroud 650 (FIG. 6A) and may address different tail rotor safety concerns and/or provide different aerodynamic performance based on the shape. As shown in FIG. 10B, tail rotor shroud 1000 includes a forward guard 1020 and an aft guard 1030 positioned relative to the tail rotor such that a person whose height is less than the height-from-ground of the guards 1020, 1030, (e.g., approximately 57 inches) would not be hit by the bottom of the tail rotor should the person walk under one of the guards.

Figure 11A:
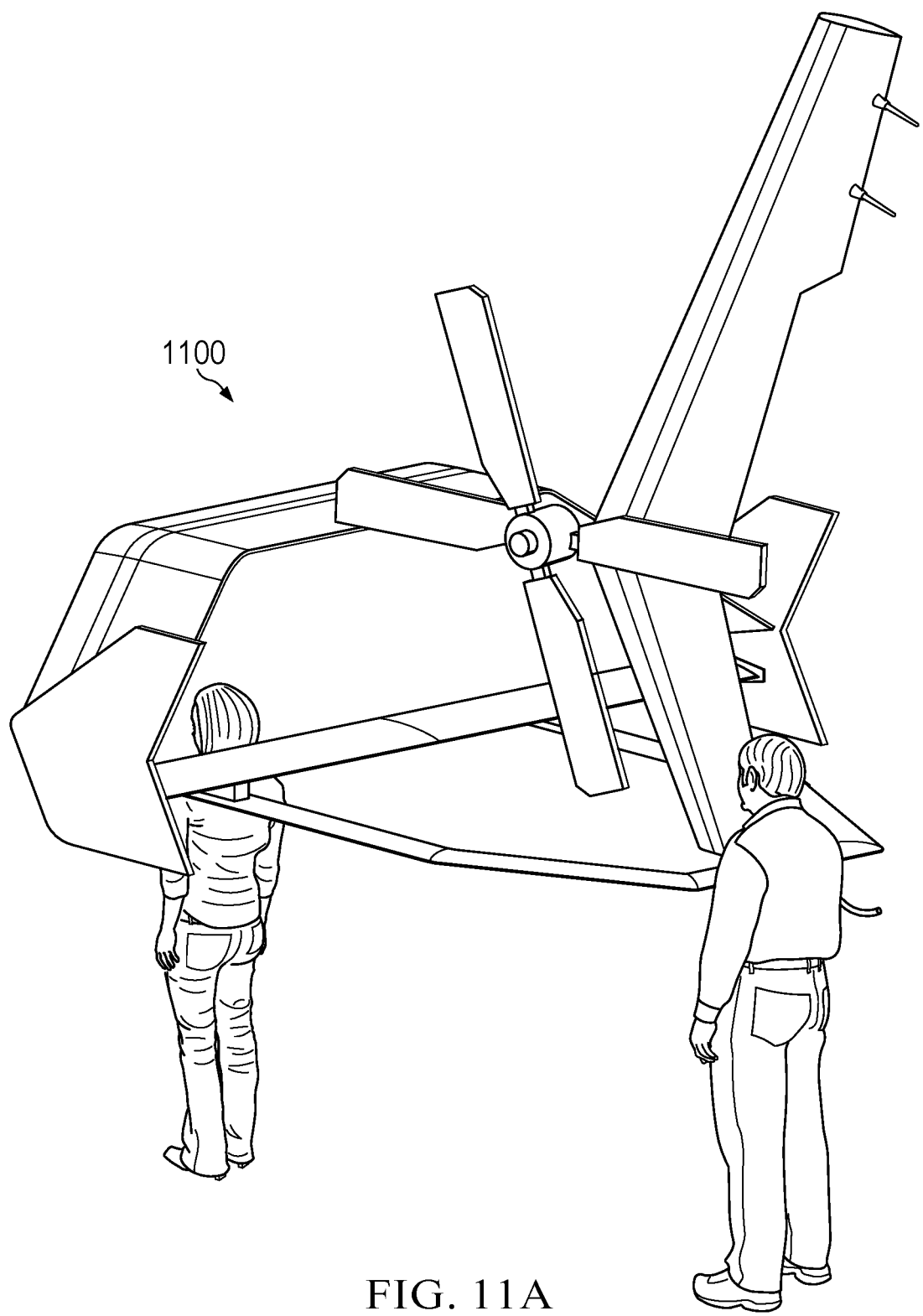
FIGS. 11A and 11B respectively illustrate additional alternative tail rotor shrouds in accordance with features of embodiments described herein.
Figure 11B:
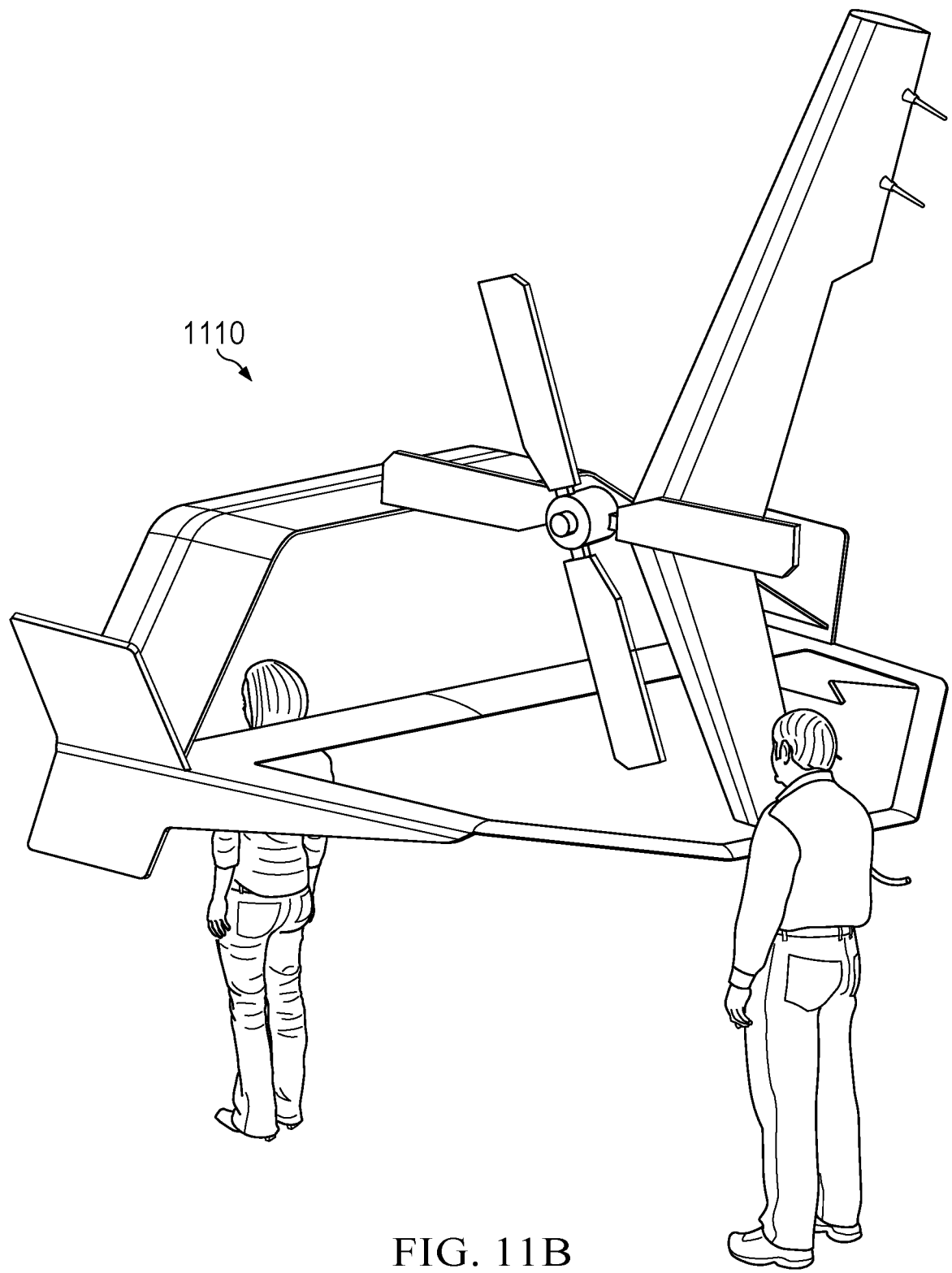

FIGS. 11A and 11B respectively illustrate additional alternative tail rotor shrouds 1100, 1110 that may be substituted for the tail rotor shrouds described above and may provide additional and/or alternative tail rotor safety and/or aerodynamic features compared to other tail rotor shrouds illustrated and described herein.

Figure 12A:
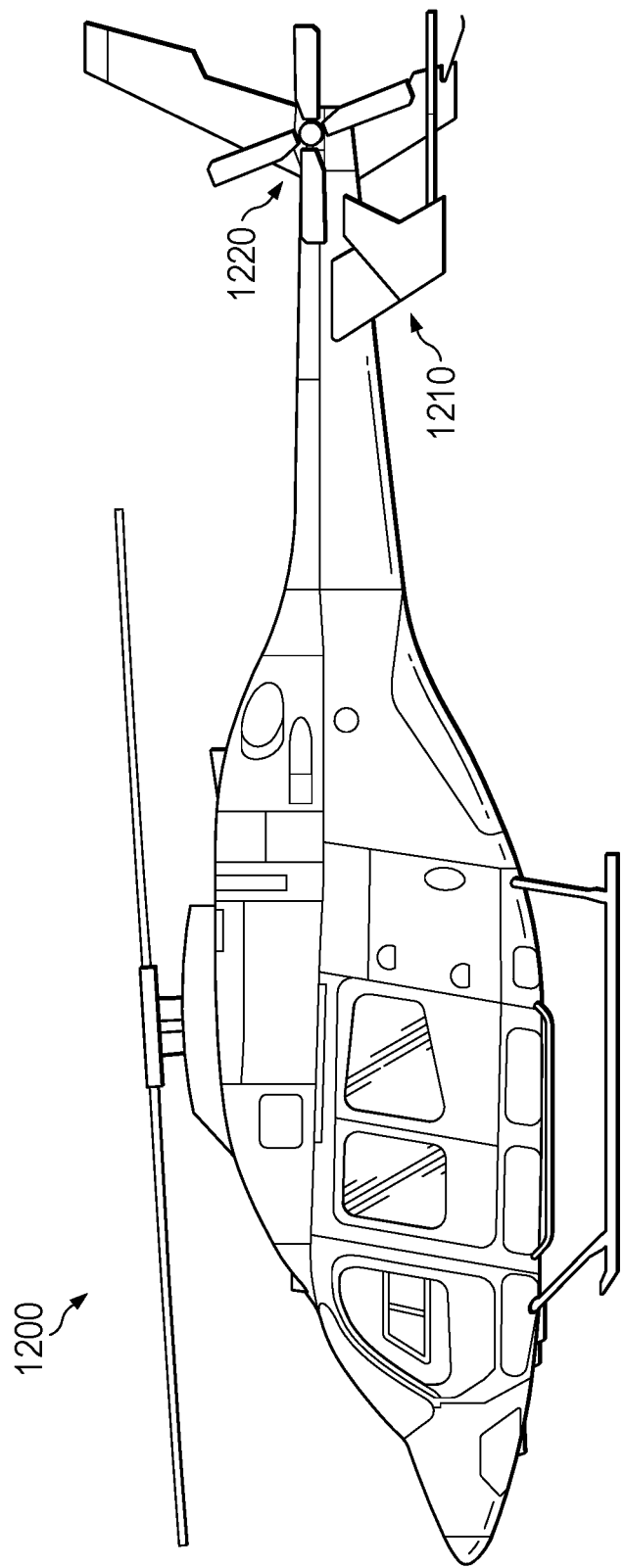
FIGS. 12A-12C respectively illustrate a side plan view, a top plan view, and a rear plan view of an aircraft having a tail rotor shroud in accordance with features of embodiments described herein.
Figure 12B:
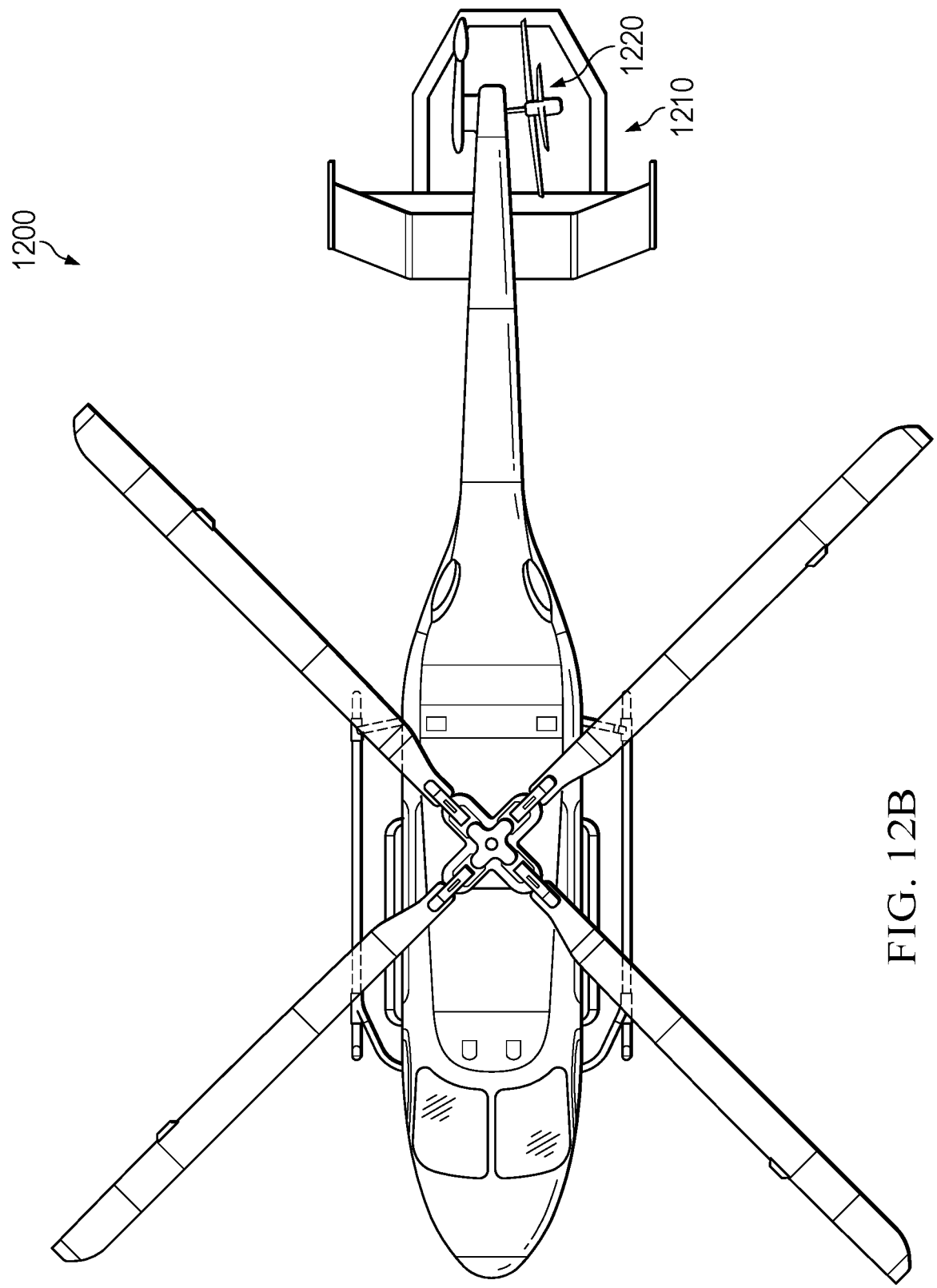
Figure 12C:
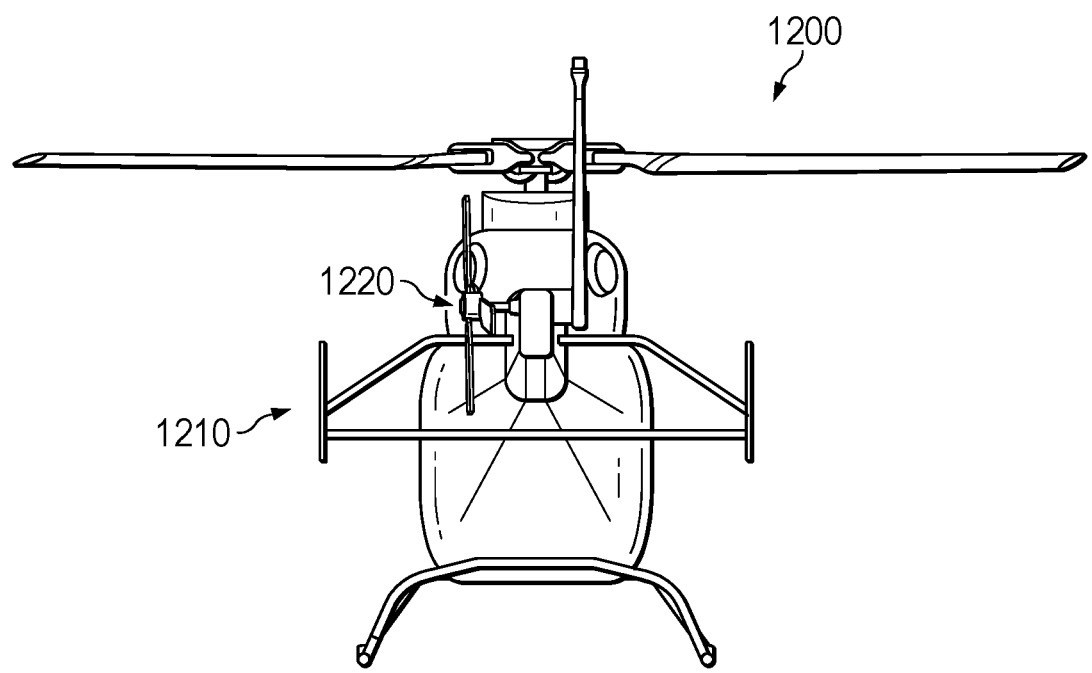

FIGS. 12A-12C respectively illustrate a side plan view, a top plan view, and a rear plan view of an aircraft 1200 including features of embodiments described herein. In particular, aircraft 1200 includes an alternative design for a tail rotor shroud 1210 for preventing unintentional contact with a tail rotor 1220 in a manner similar to that described hereinabove.

Figure 13A:
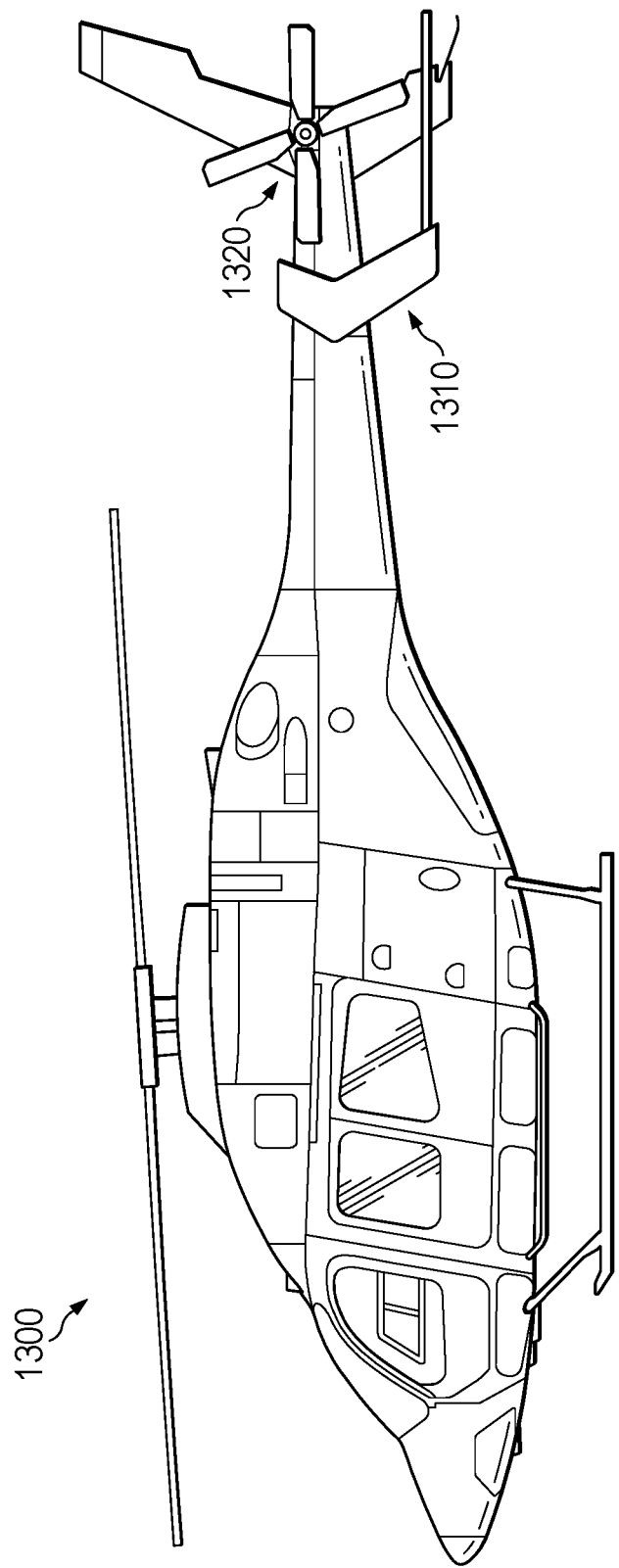
FIGS. 13A-13C respectively illustrate a side plan view, a top plan view, and a rear plan view of an aircraft having a tail rotor shroud in accordance with features of embodiments described herein.
Figure 13B:
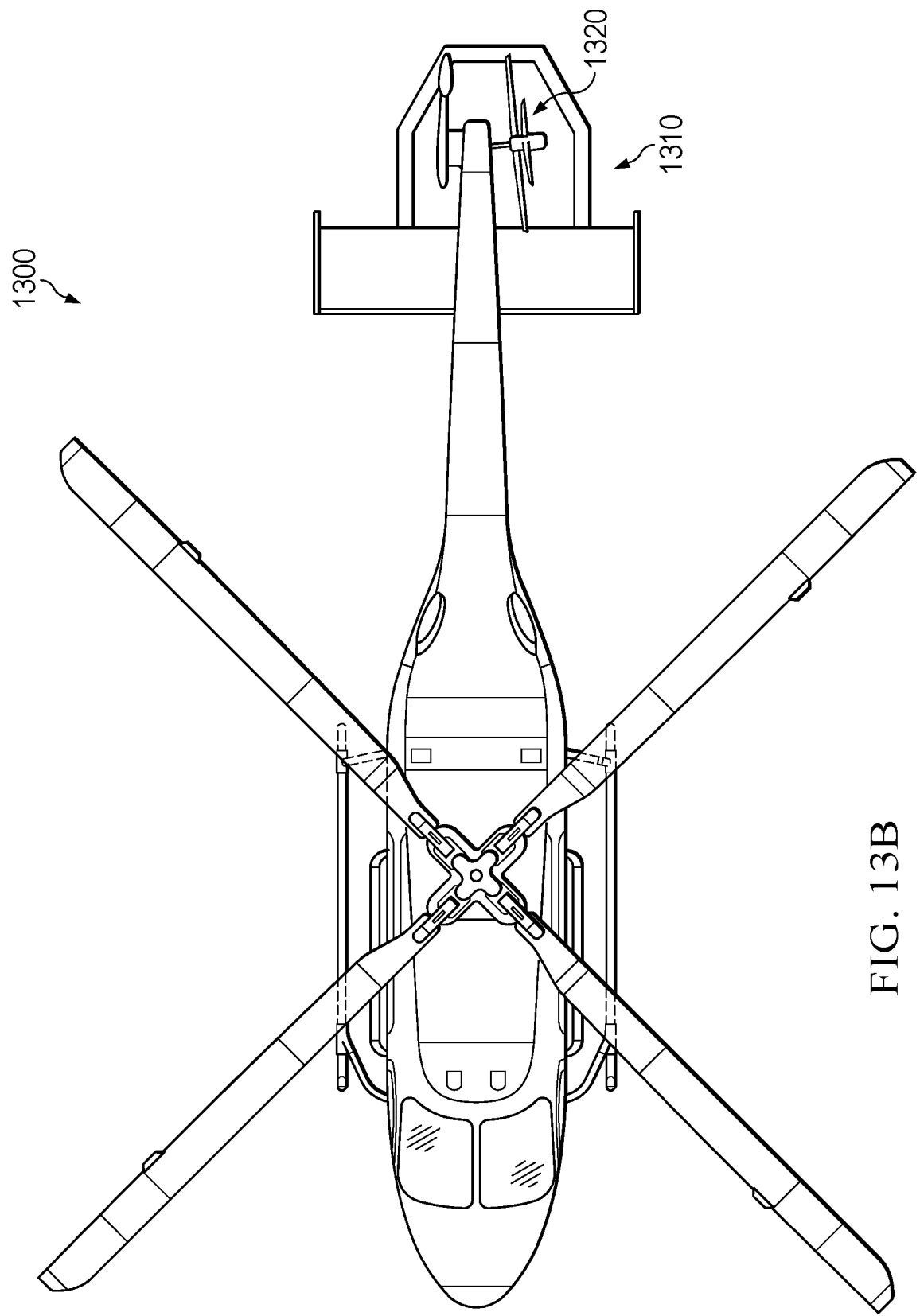
Figure 13C:
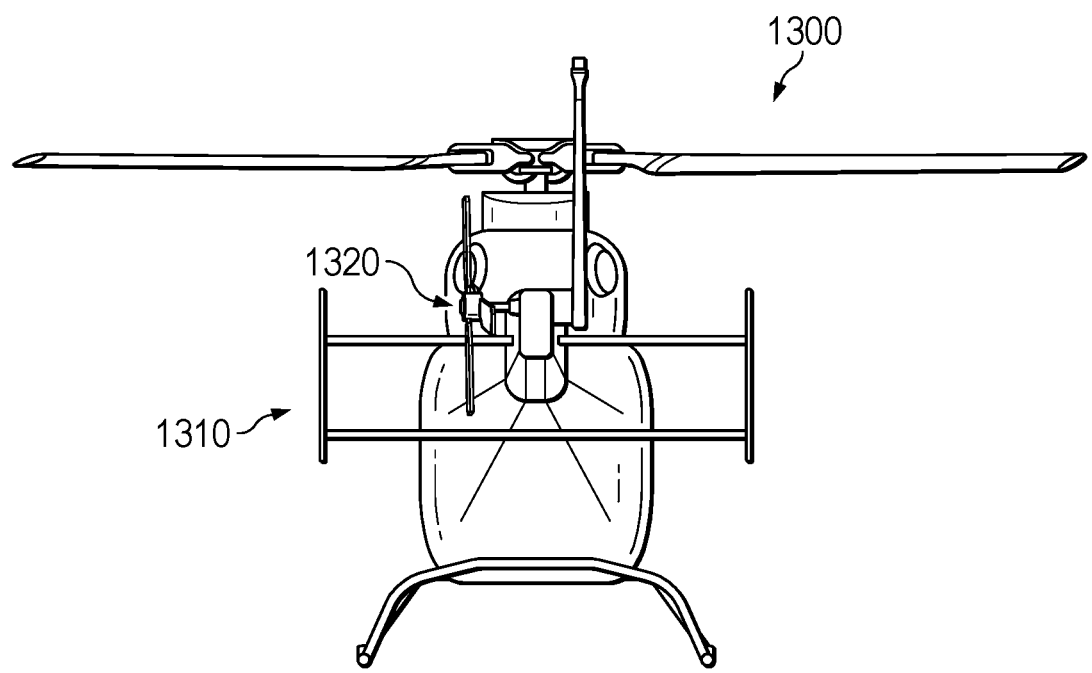

FIGS. 13A-13C respectively illustrate a side plan view, a top plan view, and a rear plan view of an aircraft 1300 including features of embodiments described herein. In particular, aircraft 1300 includes an alternative design for a tail rotor shroud 1310 for preventing unintentional contact with a tail rotor 1320 in a manner similar to that described hereinabove.

As shown in FIGS. 11A, 11B, 12A-12C, and 13A-13C, tail rotor shrouds 1100, 1110, 1210, 1310, may also includes forward and/or aft guards as described above with reference to FIGS. 7A-10B.

Figure 14A:
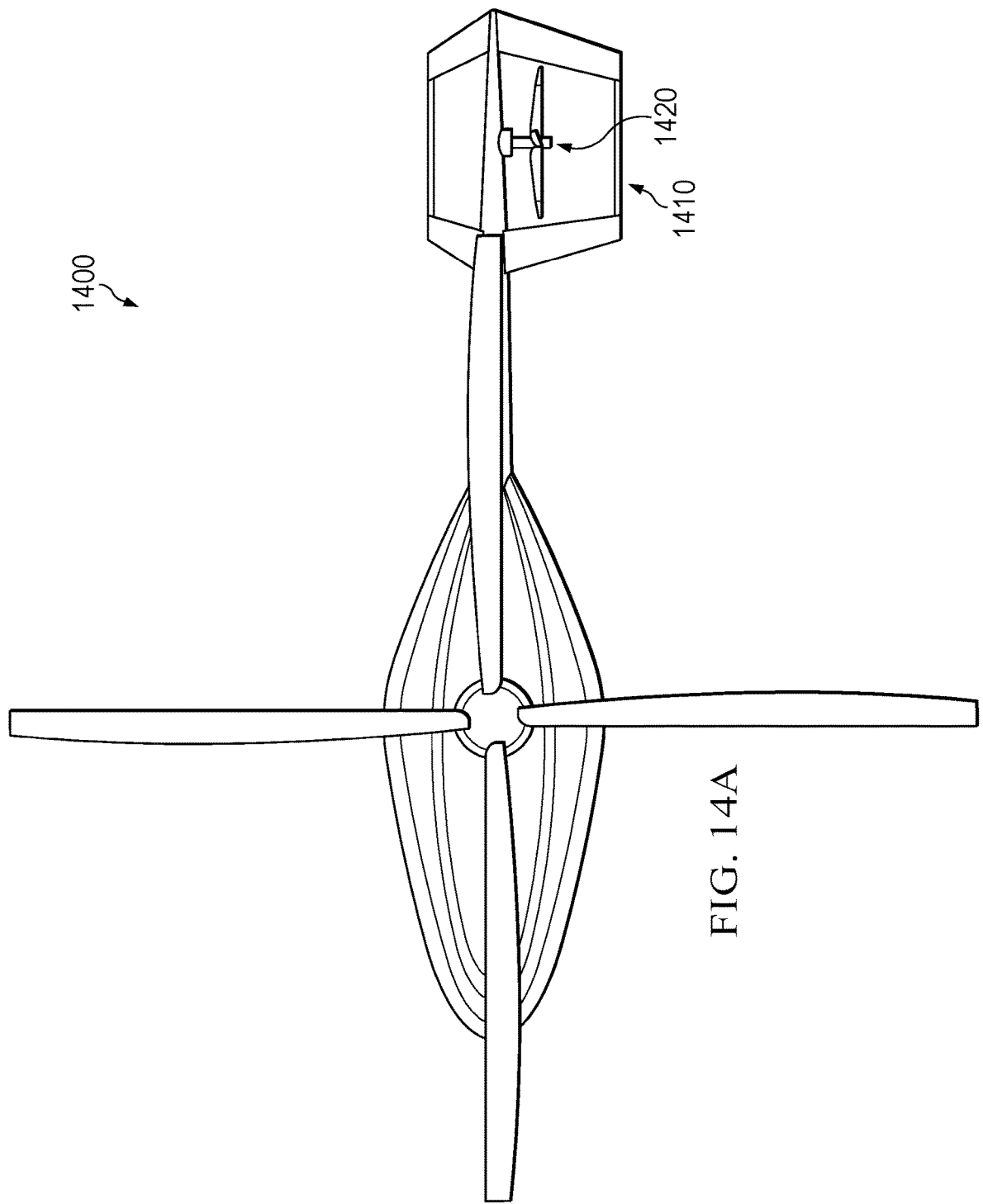
FIGS. 14A and 14B respectively illustrate a top plan view and a rear plan view of an aircraft having a tail rotor shroud in accordance with features of embodiments described herein.
Figure 14B:
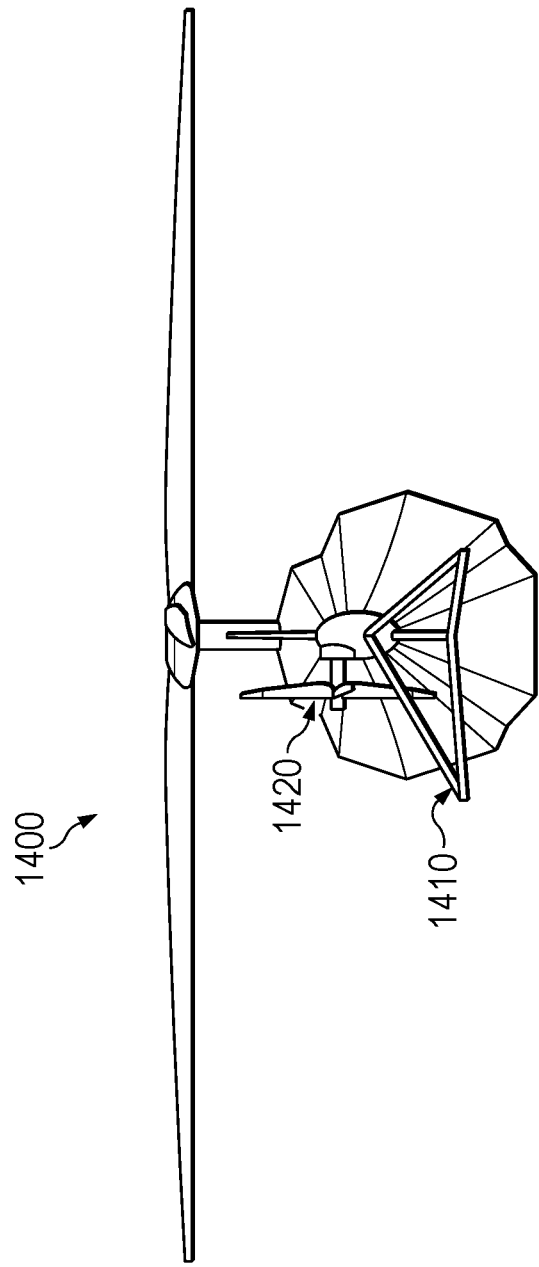

FIGS. 14A and 14B respectively illustrate a top plan view and a rear plan view of an aircraft 1400 including features of embodiments described herein. In particular, aircraft 1400 includes an alternative design for a tail rotor shroud 1410 for preventing unintentional contact with a tail rotor 1420 in a manner similar to that described hereinabove. As best shown in FIG. 14B, tail rotor shroud 1410 is implemented with asymmetrical inverted V-tails in which one inverted V-tail stabilizer of each pair of stabilizers comprising a V-tail is shorter and disposed at a different angle than the other stabilizer of the pair.

Figure 15A:
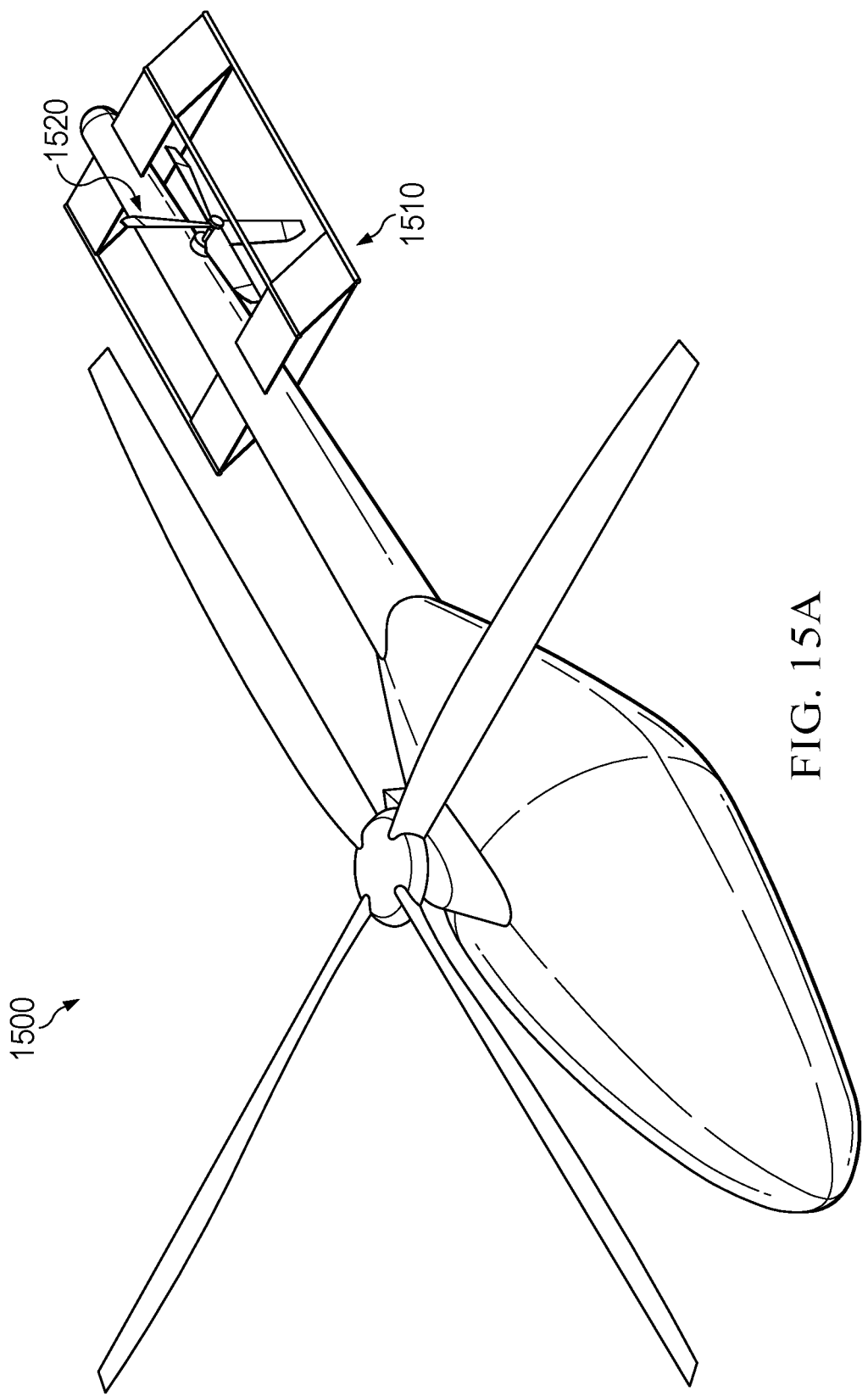
FIGS. 15A-15C respectively illustrate a top perspective view, a side plan view, and a top plan view of an aircraft 1500 including features of embodiments described herein.
Figure 15B:
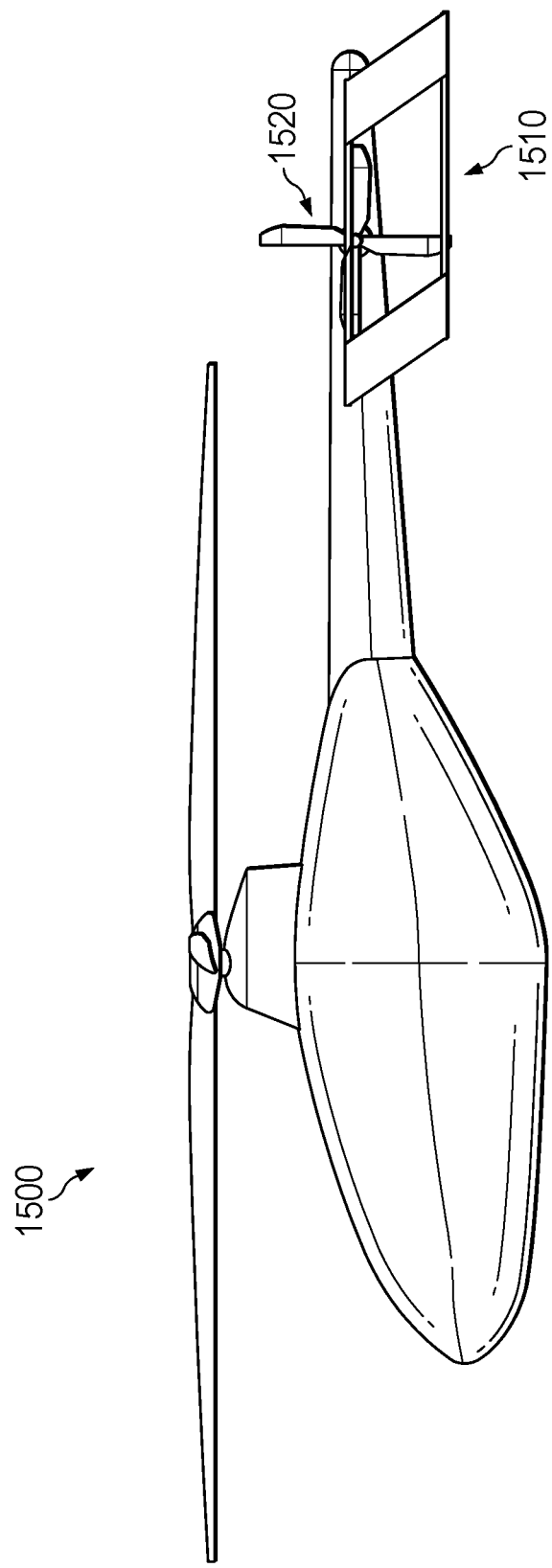
Figure 15C:
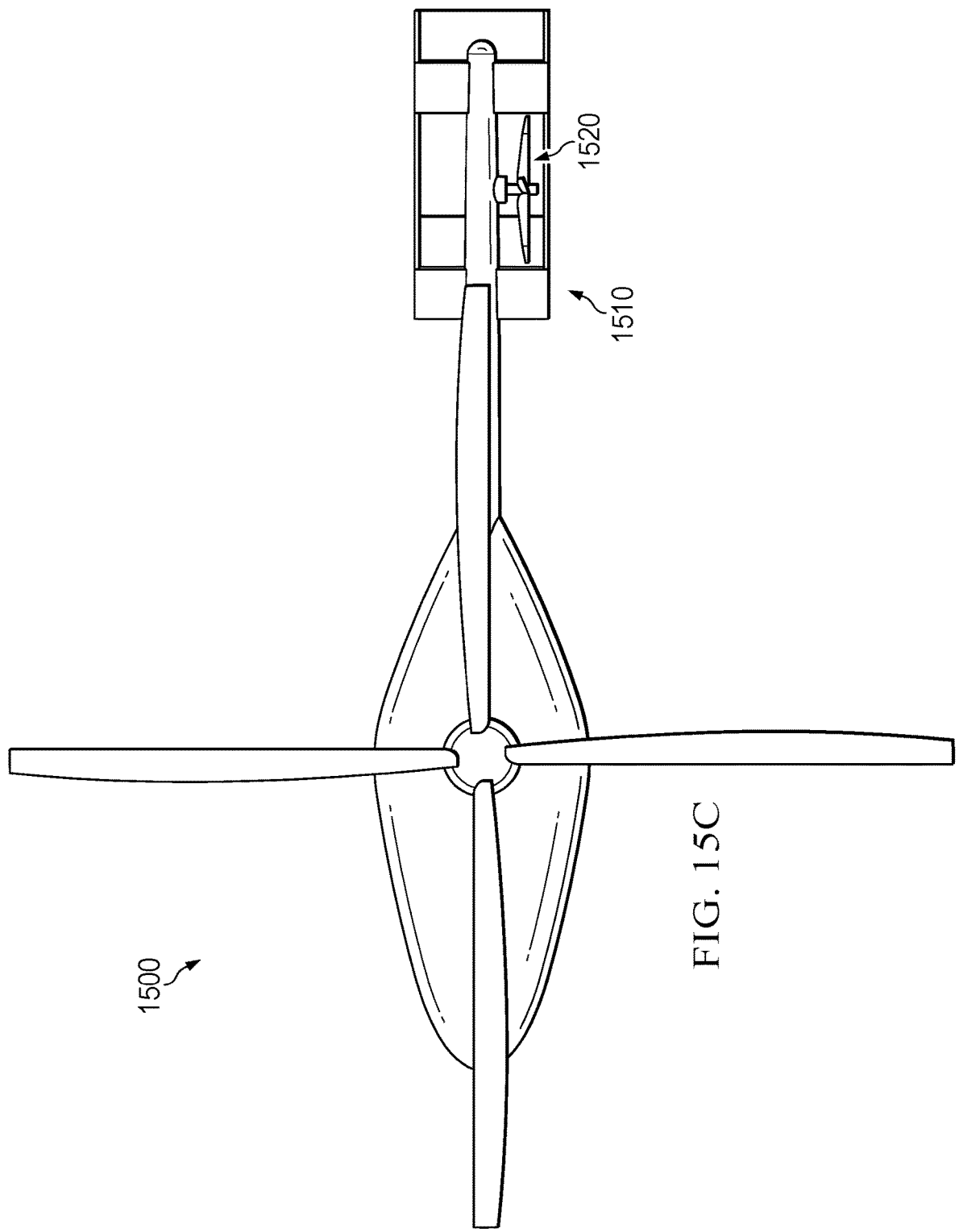

FIGS. 15A-15C respectively illustrate a top perspective view, a side plan view, and a top plan view of an aircraft 1500 including features of embodiments described herein. In particular, aircraft 1500 includes an alternative design for a tail rotor shroud 1510 for preventing unintentional contact with a tail rotor 1520 in a manner similar to that described hereinabove. In particular, the tail rotor shroud 1510 may be described as a cage in which two horizontal structures, rather than a single shroud bar, are provided to prevent unintentional contact with the tail rotor 1520.

It should be appreciated that the aircraft illustrated herein are merely illustrative of a variety of aircraft may benefit from implementation of tail rotor shrouds as described herein. Indeed, the various embodiments of tail rotor shrouds herein may be used on any type of aircraft including an open tail rotor. Other aircraft implementations can include hybrid aircraft, tiltrotor aircraft, quad tiltrotor aircraft, unmanned aircraft, gyrocopters, airplanes, helicopters, commuter aircraft, electric aircraft, hybrid-electric aircraft, and the like. As such, those skilled in the art will recognize that the embodiments described herein for an electric drive system line replaceable unit can be integrated into a variety of aircraft configurations. It should be appreciated that even though aircraft are particularly well-suited to implement the embodiments of the present disclosure, non-aircraft vehicles and devices can also implement the embodiments.

The components of rotor assemblies described herein may comprise any materials suitable for use with an aircraft rotor. For example, rotor blades and other components may comprise carbon fiber, fiberglass, or aluminum; and rotor masts and other components may comprise steel or titanium.

Example 1 is an apparatus for inhibiting accidental contact by a human with a tail rotor connected to an empennage of an aircraft, the apparatus comprising an inverted V-tail connected to an empennage of the aircraft forward of the tail rotor, the inverted V-tail stabilizer comprising a first V-tail stabilizer on a side of the empennage to which the tail rotor is connected and a second V-tail stabilizer on a side of the empennage opposite the side of the empennage to which the tail rotor is connected; and a shroud bar having a first end connected to an outboard end of the first V-tail stabilizer and a second end opposite the first end connected to the empennage aft of the tail rotor; wherein a horizontal distance from the shroud bar to the tail rotor is greater than a length of an arm of the human.

Example 2 provides the apparatus of example 1, wherein the inverted V-tail is movable.

Example 3 provides the apparatus of any of claims 1-2, wherein the inverted V-tail includes at least one control surface.

Example 4 provides the apparatus of any of examples 1-3, wherein the inverted V-tail comprises a first inverted V-tail, the apparatus further comprising a second inverted V-tail connected to the empennage aft of the tail rotor, the second inverted V-tail including a first V-tail stabilizer on side of the empennage to which the tail rotor is connected and a second V-tail stabilizer on the side of the empennage opposite the side of the empennage to which the tail rotor is connected.

Example 5 provides the apparatus of example 4, wherein the shroud bar is connected to the empennage via the first V-tail stabilizer of the second inverted V-tail.

Example 6 provides the apparatus of example 5, wherein the second end of the shroud bar is connected to the outboard end of first V-tail stabilizer of the second inverted V-tail.

Example 7 provides the apparatus of example 4, wherein at least one of the first and second inverted V-tails is movable.

Example 8 provides the apparatus of example 4, wherein at least one of the first and second inverted V-tails includes at least one control surface.

Example 9 provides the apparatus of any of examples 1-8, wherein the shroud bar comprises a substantially horizontal portion including the first end of the shroud bar and a substantially vertical portion including the second end of the shroud bar.

Example 10 provides the apparatus of any of examples 1-9, wherein the inverted V-tail is symmetrical.

Example 11 provides the apparatus of any of examples 1-10, wherein the inverted V-tail is asymmetrical.

Example 12 provides the apparatus of any of examples 1-11, wherein the inverted V-tail provides horizontal and vertical stabilization for the aircraft while the aircraft is in motion.

Example 13 provides a rotorcraft comprising a fuselage; an empennage aft of the fuselage; a tail rotor connected to a first side of the empennage; and a tail rotor shroud comprising an inverted V-tail stabilizer connected to the first side of the empennage forward of the tail rotor; and a shroud bar having a first end connected to an outboard end of the inverted V-tail stabilizer and a second end opposite the first end connected to the empennage aft of the tail rotor, wherein a horizontal distance from the shroud bar to the tail rotor is greater than a length of a human arm and wherein the tail rotor shroud provides ground strike protection for the tail rotor.

Example 14 provides the rotorcraft of example 13, wherein the inverted V-tail stabilizer comprises a first inverted V-tail stabilizer and the tail rotor shroud further comprises a second inverted V-tail stabilizer connected to the first side of the empennage aft of the tail rotor.

Example 15 provides the rotorcraft of example 14, wherein the second end of the shroud bar is connected to the outboard end of the second inverted V-tail stabilizer.

Example 16 provides the rotorcraft of example 14, wherein at least one of the first and second inverted V-tail stabilizers is movable.

Example 17 provides the rotorcraft of example 14, wherein at least one of the first and second inverted V-tail stabilizers includes a control surface.

Example 18 provides the rotorcraft of any of examples 13-17, further comprising a vertical stabilizer proximate an aft end of the empennage.

Example 19 provides a protective shroud for a tail rotor on a first side of an empennage of a helicopter, the protective shroud comprising a first inverted V-tail stabilizer connected to the first side of the empennage forward of the tail rotor; a second inverted V-tail stabilizer connected to the first side of the empennage aft of the tail rotor; and a shroud bar having a first end connected to an outboard end of the first inverted V-tail stabilizer and a second end opposite the first end connected an outboard end of the second inverted V-tail stabilizer; wherein a horizontal distance from the shroud bar to the tail rotor is greater than a length of a human arm, and wherein first and second V-tail stabilizers provide horizontal stabilization and vertical stabilization for the helicopter.

Example 20 provides the rotorcraft of example 19, wherein at least one of the first and second inverted V-tail stabilizers is movable, includes a control surface, or both.

At least one embodiment is disclosed, and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, RI, and an upper limit, Ru, is disclosed, any number falling within the range is specifically disclosed. In particular, the following numbers within the range are specifically disclosed: $R=RI+k*(Ru-RI)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C. The terms "substantially," "close," "approximately," "near," and "about," generally refer to being within +/−5-20% of a target value based on the context of a particular value as described herein or as known in the art. Similarly, terms indicating orientation of various elements, e.g., "coplanar," "perpendicular," "orthogonal," "parallel," or any other angle between the elements, generally refer to being within +/−5-20% of a target value based on the context of a particular value as described herein or as known in the art.

The diagrams in the FIGURES illustrate the architecture, functionality, and/or operation of possible implementations of various embodiments of the present disclosure. Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

One or more advantages mentioned herein do not in any way suggest that any one of the embodiments described herein necessarily provides all the described advantages or that all the embodiments of the present disclosure necessarily provide any one of the described advantages. Note that in this specification, references to various features included in "one embodiment", "example embodiment", "an embodiment", "another embodiment", "certain embodiments", "some embodiments", "various embodiments", "other embodiments", "alternative embodiment", and the like are intended to mean that any such features are included in one or more embodiments of the present disclosure but may or may not necessarily be combined in the same embodiments.

As used herein, unless expressly stated to the contrary, use of the phrase "at least one of," "one or more of" and "and/or" are open ended expressions that are both conjunctive and disjunctive in operation for any combination of named elements, conditions, or activities. For example, each of the expressions "at least one of X, Y and Z", "at least one of X, Y or Z", "one or more of X, Y and Z", "one or more of X, Y or Z" and "A, B and/or C" can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms "first," "second," "third," etc., are intended to distinguish the particular nouns (e.g., blade, rotor, element, device, condition, module, activity, operation, etc.) they modify. Unless expressly stated to the contrary, the use of these terms is not intended to indicate any type of order, rank, importance, temporal sequence, or hierarchy of the modified noun. For example, "first X" and "second X" are intended to designate two X elements that are not necessarily limited by any order, rank, importance, temporal sequence, or hierarchy of the two elements. As referred to herein, "at least one of," "one or more of," and the like can be represented using the "(s)" nomenclature (e.g., one or more element(s)).

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. Apparatus for inhibiting accidental contact by a human with a tail rotor connected to an empennage of an aircraft, the apparatus comprising:
   an inverted V-tail stabilizer connected to an empennage of the aircraft forward of the tail rotor, the inverted V-tail stabilizer comprising a first V-tail stabilizer portion on a side of the empennage to which the tail rotor is connected and a second V-tail stabilizer portion on a side of the empennage opposite the side of the empennage to which the tail rotor is connected, and
   a shroud bar having a first end connected to an outboard end of the first V-tail stabilizer portion and a second end opposite the first end connected directly to the empennage aft of the tail rotor.

2. The apparatus of claim 1, wherein the inverted V-tail stabilizer is movable.

3. The apparatus of claim 1, wherein the inverted V-tail stabilizer includes at least one control surface.

4. The apparatus of claim 1, wherein the inverted V-tail stabilizer comprises a forward inverted V-tail stabilizer, the apparatus further comprising an aft inverted V-tail stabilizer connected to the empennage aft of the tail rotor, the aft inverted V-tail stabilizer including a first V-tail stabilizer portion on side of the empennage to which the tail rotor is connected and a second V-tail stabilizer portion on the side of the empennage opposite the side of the empennage to which the tail rotor is connected.

5. The apparatus of claim 4, wherein the shroud bar is connected to the empennage via the first V-tail stabilizer portion of the aft inverted V-tail stabilizer.

6. The apparatus of claim 5, wherein the second end of the shroud bar is connected to the outboard end of the first V-tail stabilizer portion of the aft inverted V-tail stabilizer.

7. The apparatus of claim 4, wherein at least one of the forward and aft inverted V-tail stabilizers is movable.

8. The apparatus of claim 4, wherein at least one of the forward and aft inverted V-tail stabilizers includes at least one control surface.

9. The apparatus of claim 1, wherein the shroud bar comprises a substantially horizontal portion including the first end of the shroud bar and a substantially vertical portion including the second end of the shroud bar.

10. The apparatus of claim 1, wherein the inverted V-tail stabilizer is symmetrical.

11. The apparatus of claim 1, wherein the inverted V-tail stabilizer is asymmetrical.

12. The apparatus of claim 1, wherein the inverted V-tail stabilizer provides horizontal and vertical stabilization for the aircraft while the aircraft is in motion.

13. A rotorcraft comprising:
   a fuselage;
   an empennage aft of the fuselage;
   a tail rotor connected to a first side of the empennage; and
   a tail rotor shroud comprising:
      an inverted V-tail stabilizer connected to the empennage forward of the tail rotor, wherein a portion of the inverted V-tail stabilizer is on the first side of the empennage; and
      a shroud bar having a first end connected to an outboard end of the portion of the inverted V-tail stabilizer and a second end opposite the first end connected directly to the empennage aft of the tail rotor;
   wherein the tail rotor shroud provides ground strike protection for the tail rotor.

14. The rotorcraft of claim 13, wherein the inverted V-tail stabilizer comprises a forward inverted V-tail stabilizer, the rotorcraft further comprising an aft inverted V-tail stabilizer, wherein a portion of the aft inverted V-tail stabilizer is on the first side of the empennage aft of the tail rotor.

15. The rotorcraft of claim 14, wherein the second end of the shroud bar is connected to an outboard end of the portion of the aft inverted V-tail stabilizer.

16. The rotorcraft of claim 14, wherein at least one of the forward and aft inverted V-tail stabilizers is movable.

17. The rotorcraft of claim 14, wherein at least one of the forward and aft inverted V-tail stabilizers includes a control surface.

18. The rotorcraft of claim 13, further comprising a vertical stabilizer proximate an aft end of the empennage.

19. A protective shroud for a tail rotor on a first side of an empennage of a helicopter comprising a forward inverted V-tail stabilizer and an aft inverted V-tail stabilizer, the protective shroud comprising:
   a portion of the forward inverted V-tail stabilizer connected to the first side of the empennage forward of the tail rotor;
   a portion of the aft inverted V-tail stabilizer connected to the first side of the empennage aft of the tail rotor; and
   a shroud bar having a first end connected to an outboard end of the portion of the forward inverted V-tail stabilizer and a second end opposite the first end connected an outboard end of the portion of the aft inverted V-tail stabilizer;
   wherein the forward and aft V-tail stabilizers are configured to provide horizontal stabilization and vertical stabilization for the helicopter.

20. The protective shroud of claim 19, wherein at least one of the forward and aft inverted V-tail stabilizers is movable, includes a control surface, or both.

* * * * *